United States Patent
Dutton et al.

(10) Patent No.: US 12,345,834 B2
(45) Date of Patent: *Jul. 1, 2025

(54) TIME TO DIGITAL CONVERTER

(71) Applicant: STMicroelectronics (Research & Development) Limited, Marlow (GB)

(72) Inventors: Neale Dutton, Edinburgh (GB); John Kevin Moore, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,534

(22) Filed: Dec. 20, 2023

(65) Prior Publication Data

US 2024/0118397 A1   Apr. 11, 2024

Related U.S. Application Data

(63) Continuation of application No. 16/834,347, filed on Mar. 30, 2020, now Pat. No. 11,885,915.

(51) Int. Cl.
*G01S 7/4865* (2020.01)
*G01S 17/10* (2020.01)
*G01S 17/89* (2020.01)

(52) U.S. Cl.
CPC ............ *G01S 7/4865* (2013.01); *G01S 17/10* (2013.01); *G01S 17/89* (2013.01)

(58) Field of Classification Search
CPC .... G01S 7/4865; G01S 7/4863; G01S 7/4873; G01S 17/10; G01S 17/89; G01S 17/894; G04F 10/005; H03M 1/50
See application file for complete search history.

(56) References Cited

U.S. PATENT DOCUMENTS 6,754,613 B2   6/2004 Tabatabaei et al.
9,639,063 B2   5/2017 Dutton et al.
(Continued)

FOREIGN PATENT DOCUMENTS

CN   1694491 A   11/2005
CN   101136632 A   3/2008
(Continued)

OTHER PUBLICATIONS

Villa, Federica, and et al. "High-Fill-Factor 60×1 SPAD Array with 60 Sub-nanosecond Integrated TDCs." IEEE Photonics Technology Letters 27, No. 12 (2015): 1261-1264 (Year: 2015).*

(Continued)

*Primary Examiner* — Douglas Kay
(74) *Attorney, Agent, or Firm* — Slater Matsil, LLP

(57) ABSTRACT

In an embodiment, a method includes: receiving a first plurality of digital codes from a time-to-digital converter (TDC); generating a coarse histogram from the first plurality of digital codes; detecting a peak coarse bin from the plurality of coarse bins; after receiving the first plurality of digital codes, receiving a second plurality of digital codes from the TDC; and generating a fine histogram from the second plurality of digital codes based on the detected peak coarse bin, where a fine histogram depth range is narrower than a coarse histogram depth range, where a lowest fine histogram depth is lower or equal to a lowest coarse peak depth, and where a highest fine histogram depth is higher or equal to a highest coarse peak depth.

20 Claims, 12 Drawing Sheets

(56) References Cited

U.S. PATENT DOCUMENTS

| | | | |
|---|---|---|---|
| 9,746,832 B1 | 8/2017 | Yao | |
| 10,317,529 B2 | 6/2019 | Shu et al. | |
| 10,895,848 B1* | 1/2021 | Buckley | G01S 7/4865 |
| 11,885,915 B2* | 1/2024 | Dutton | G04F 10/005 |
| 2005/0231624 A1 | 10/2005 | Muramatsu et al. | |
| 2006/0251200 A1 | 11/2006 | Miller | |
| 2007/0136012 A1* | 6/2007 | Miller | G01R 31/3171 702/67 |
| 2007/0273569 A1 | 11/2007 | Lin | |
| 2014/0292552 A1 | 10/2014 | Kim et al. | |
| 2016/0209498 A1 | 7/2016 | Kanter et al. | |
| 2016/0260203 A1 | 9/2016 | He et al. | |
| 2017/0052065 A1 | 2/2017 | Sharma et al. | |
| 2018/0164415 A1 | 6/2018 | Buckley et al. | |
| 2018/0246212 A1 | 8/2018 | Moore et al. | |
| 2018/0253404 A1 | 9/2018 | Moore et al. | |
| 2019/0018119 A1 | 1/2019 | Laifenfeld et al. | |
| 2019/0129012 A1 | 5/2019 | Ikuta et al. | |
| 2019/0132537 A1 | 5/2019 | Webster | |
| 2019/0230304 A1 | 6/2019 | Moore et al. | |
| 2019/0353760 A1* | 11/2019 | Hasegawa | H01L 31/107 |
| 2020/0018642 A1 | 1/2020 | Yin et al. | |
| 2020/0116838 A1 | 4/2020 | Erdogan et al. | |
| 2020/0233068 A1* | 7/2020 | Henderson | H04N 25/773 |
| 2021/0199802 A1 | 7/2021 | Mautner et al. | |
| 2021/0302550 A1 | 9/2021 | Dutton et al. | |
| 2022/0171037 A1 | 6/2022 | Barry et al. | |

FOREIGN PATENT DOCUMENTS

| | | | |
|---|---|---|---|
| CN | 103516367 A | 1/2014 | |
| CN | 107809226 A | 3/2018 | |
| CN | 110376872 A | 10/2019 | |
| CN | 110596725 A | 12/2019 | |
| CN | 110609293 A | 12/2019 | |
| KR | 20120113546 A | 10/2012 | |
| WO | WO-2018122560 A1 * | 7/2018 | G01J 3/44 |
| WO | 2019243038 A1 | 12/2019 | |
| WO | 2020049203 A1 | 3/2020 | |
| WO | 2021026241 A1 | 2/2021 | |

OTHER PUBLICATIONS

Bruschini, Claudio et al., "Single-photon avalanche diode image rs in biophotonics: review and outlook." Light: Science & Applications 8, No. 1, (2019): 87).

Hwang, C-S. et al., "A High-Precision Time-to-Digital Converter Using a Two-Level Conversion Scheme," IEEE Transactions on Nuclear Science, vol. 51, Issue 4, Aug. 2004, pp. 174-176.

Kalisz, J., "Review of Methods for Time Interval Measurements with Picosecond Resolution," Institute of Physics Publishing, Metrologia 41, Feb. 2004, pp. 17-32.

Niclass, Cristiano et al., "A 128×128 Single-Photon Image Sensor With col. Level 10-Bit Time-to-Digital Converter Array." IEEE Journal of Solid-State Circuits 43, No. 12 (2008): 2977-2989).

Schaub, J. D., et al., "On-chip Jitter and Oscilloscope Circuits Using an Asynchronous Sample Clock", ESSCIRC 2008—34th European Solid-State Circuits Conference, Sep. 15-19, 2008, IEEE Xplore: Nov. 18, 2008.

Seo, H. et al., "Histogram-based mixed-signal time-to-digital-converter array for direct time-of-flight depth sensors," Electronic Letters, vol. 55, No. 6, Mar. 21, 2019, 2 pages.

Szyduczynski, J. et al., "A Successive Approximation Time-to-Digital Converter with Single Set of Delay Lines for Time Interval Measurements," Sensors, 19, 1109, Mar. 2019, www.mdpi.com/journal/sensors, pp. 1-27.

* cited by examiner top view top view

TIME TO DIGITAL CONVERTER

CROSS-REFERENCE TO RELATED APPLICATIONS

This application is a continuation of U.S. patent application Ser. No. 16/834,347, filed on Mar. 30, 2020, which application is hereby incorporated herein by reference.

TECHNICAL FIELD

The present disclosure relates generally to an electronic system and method, and, in particular embodiments, to a time-to-digital converter (TDC).

BACKGROUND

A TDC provides a digital representation of a time associated with events. For example, a TDC may be used to measure a time between a first event and a second event.

An implementation of a TDC may use a counter. The counter is started when the first event occurs and it is stopped when the second event occurs. The resulting count of the counter is a representation of the time between the first event and the second event. The time may be calculated by using the resulting count and the frequency of the clock received by the counter. In this type of TDC implementation, a higher clock frequency typically results in higher time resolution.

A TDC may be used, for example, in ranging systems that use time of flight (ToF) techniques to determine distance. For example, in ToF systems, a pulse of light is emitted, e.g., with a vertical-cavity surface-emitting laser (VCSEL) and reflected off an object back to a photonic sensor, such as a single photon avalanche diode (SPAD). The time taken for the light to travel to the object and be reflected back onto the single photonic sensor may be used to determine the distance between the object and the device based on the known speed of light. In such ToF system, a TDC may be used to generate a digital representation of the time between the transmitting of the pulse of light and the receiving of the reflected pulse by the photonic sensor.

SUMMARY

In accordance with an embodiment, a method includes: receiving a first plurality of digital codes from a TDC; generating a coarse histogram from the first plurality of digital codes, the coarse histogram including a plurality of coarse bins that collectively correspond to a coarse histogram depth range from a lower coarse histogram depth to a higher coarse histogram depth; detecting a peak coarse bin from the plurality of coarse bins, where the peak coarse bin corresponds to a peak coarse bin depth range from a lower coarse peak depth to a higher coarse peak depth; after receiving the first plurality of digital codes, receiving a second plurality of digital codes from the TDC; and generating a fine histogram from the second plurality of digital codes based on the detected peak coarse bin, the fine histogram including a plurality of fine bins that collectively correspond to a fine histogram depth range from a lower fine histogram depth to a higher fine histogram depth, where the fine histogram depth range is narrower than the coarse histogram depth range, where the lower fine histogram depth is lower or equal to the lower coarse peak depth, and where the higher fine histogram depth is higher or equal to the higher coarse peak depth.

In accordance with an embodiment, a circuit includes: a TDC; a histogram generation circuit; and a control circuit, where the histogram generation circuit is configured to cooperate with the control circuit to: receive a first plurality of digital codes from the TDC, generate a coarse histogram from the first plurality of digital codes, the coarse histogram including a plurality of coarse bins that collectively correspond to a coarse histogram depth range from a lower coarse histogram depth to a higher coarse histogram depth, detect a peak coarse bin from the plurality of coarse bins, where the peak coarse bin corresponds to a peak coarse bin depth range from a lower coarse peak depth to a higher coarse peak depth, after receiving the first plurality of digital codes, receive a second plurality of digital codes from the TDC, and generate a fine histogram from the second plurality of digital codes based on the detected peak coarse bin, the fine histogram including a plurality of fine bins that collectively correspond to a fine histogram depth range from a lower fine histogram depth to a higher fine histogram depth, where the fine histogram depth range is narrower than the coarse histogram depth range, where the lower fine histogram depth is lower or equal to the lower coarse peak depth, and where the higher fine histogram depth is higher or equal to the higher coarse peak depth.

In accordance with an embodiment, a system includes: a pixel array arranged in N rows and M columns, where N is a positive integer greater than 1, and where M is a positive integer greater than 1, and where each pixel includes a SPAD; a plurality of TDCs, where each of the plurality of TDCs is associated with a respective pixel of the pixel array; a plurality of histogram generation circuits, where each of the plurality of histogram generation circuits is associated with a respective TDC of the plurality of TDCs and with a respective pixel of the pixel array; and a column control circuit including M control circuits, each of the M control circuits configured to cooperate with histogram generation circuits associated with a corresponding column of pixels to: receive a first plurality of digital codes from the respective TDC, generate a coarse histogram from the first plurality of digital codes, the coarse histogram including a plurality of coarse bins that collectively correspond to a coarse histogram depth range from a lower coarse histogram depth to a higher coarse histogram depth, detect a peak coarse bin from the plurality of coarse bins, where the peak coarse bin corresponds to a peak coarse bin depth range from a lower coarse peak depth to a higher coarse peak depth, after receiving the first plurality of digital codes, receive a second plurality of digital codes from the respective TDC, and generate a fine histogram from the second plurality of digital codes based on the detected peak coarse bin, the fine histogram including a plurality of fine bins that collectively correspond to a fine histogram depth range from a lower fine histogram depth to a higher fine histogram depth, where the fine histogram depth range is narrower than the coarse histogram depth range, where the lower fine histogram depth is lower or equal to the lower coarse peak depth, and where the higher fine histogram depth is higher or equal to the higher coarse peak depth.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a TDC that includes a circuit for histogram generation, e.g., for a ToF image sensor. Embodiments of the present invention may be used in applications other than a ToF image sensor, such as applications in which time measurements between two signal pulses, with corresponding histogram generation, is desirable. Some embodiments may be used in ToF applications including proximity sensors, light detection and ranging (LIDAR), depth profiling, autofocus for cameras, and others. Embodiments may also be used in applications that measure time between events and/or utilize time stamps of events.

In an embodiment of the present invention, a ToF image sensor includes an array of pixels arranged in N rows and M columns. Each pixel includes a SPAD and a corresponding TDC underneath the SPAD. M control circuits respectively associated with corresponding columns of the pixel array generate, in cooperation with the SPADs in the respective column, respective zoomed histograms associated with distance measurements between the ToF image sensor and a target. In some embodiments, the zoomed histograms are compact histograms that include depth information around a detected target and exclude depth information that is farther away from the target. Thus, some embodiments advantageously can achieve higher resolution depth detection without increasing the number of bins of the histogram. In some embodiments, a smaller number of bins advantageously results in lower area consumption of the ToF image sensor without sacrificing the resolution of the ToF image sensor.

Figure 1:
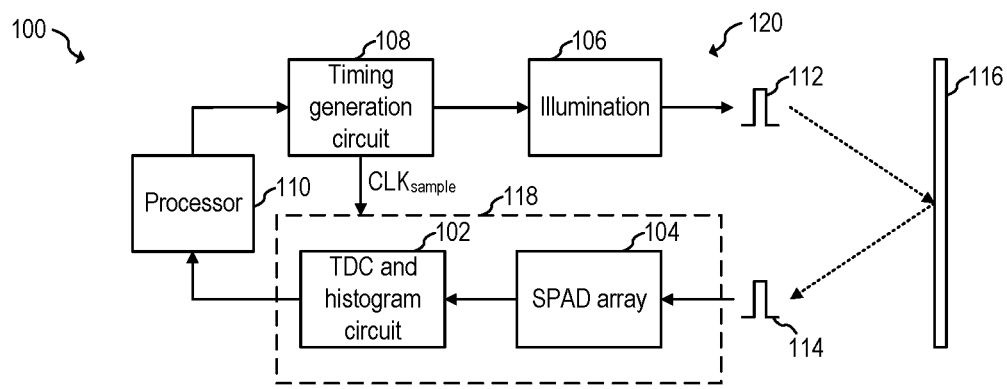
FIG. 1 shows a ToF imaging system 10, according to an embodiment of the present invention.

FIG. 1 shows ToF imaging system 100, according to an embodiment of the present invention. ToF imaging system 100 includes illumination source 106, ToF image sensor 118, and processor 110. ToF image sensor 118 includes SPAD array 104 and TDC and histogram circuit 102. In some embodiments, TDC and histogram circuit 102 is distributed inside SPAD array 104. In other embodiments, TDC and histogram circuit 102 is disposed adjacent to SPAD array 104.

In some embodiments, timing generation circuit 108, illumination source 106, and ToF image sensor 118 are implemented inside integrated circuit (IC) 120, while processor 110 is separate from IC 120. In other embodiments, processor 110 is inside IC 120.

During normal operation, illumination source 106 emits radiation pulses 112 (e.g., light signals or light pulses) towards object 116, e.g., at times controlled by timing generator circuit 108. Reflected radiation pulses 114 are sensed by SPAD array 104. TDC and histogram circuit 102 generates digital representations (e.g., in the form of a histogram) of the time between the emissions of radiation pulses 112 and receptions of reflected radiation pulses 114. Processor no then processes the information data received from ToF image sensor 118, e.g., to determine the distance to object 116.

Illumination source 106 may be implemented in any way known in the alt. For example, illumination source 106 may be implemented as a VCSEL. Other implementations are also possible.

Processor no may be implemented as a general purpose digital signal processor (DSP), processor or controller that includes, for example, combinatorial circuits coupled to a memory. Processor no may also be implemented as a custom application-specific integrated circuit (ASIC). Other implementations are also possible.

ToF image sensor 118 may be a direct ToF (DTOF) image sensor, e.g., for a mobile device. In some embodiments, ToF image sensor 118 has a spatial resolution of 480×360, a 1 ns or better precision across distance range of 12 m, 80 ns, and a TDC nominal resolution of about 500 ps. In other embodiments, ToF image sensor may have a spatial resolution different than 480×360, such as higher resolution or a lower resolution, and may have a precision different than 1 ns across distance range of 12 m, 80 ns, such as a precision of 800 ps, 500 ps, or higher, or a precision of 2.5 ns, 5 ns, or lower, across a distance higher than 12 m, such as 15 m or higher, or a distance lower than 12 m, such as 10 m, 8 m, or lower.

Figure 2A:
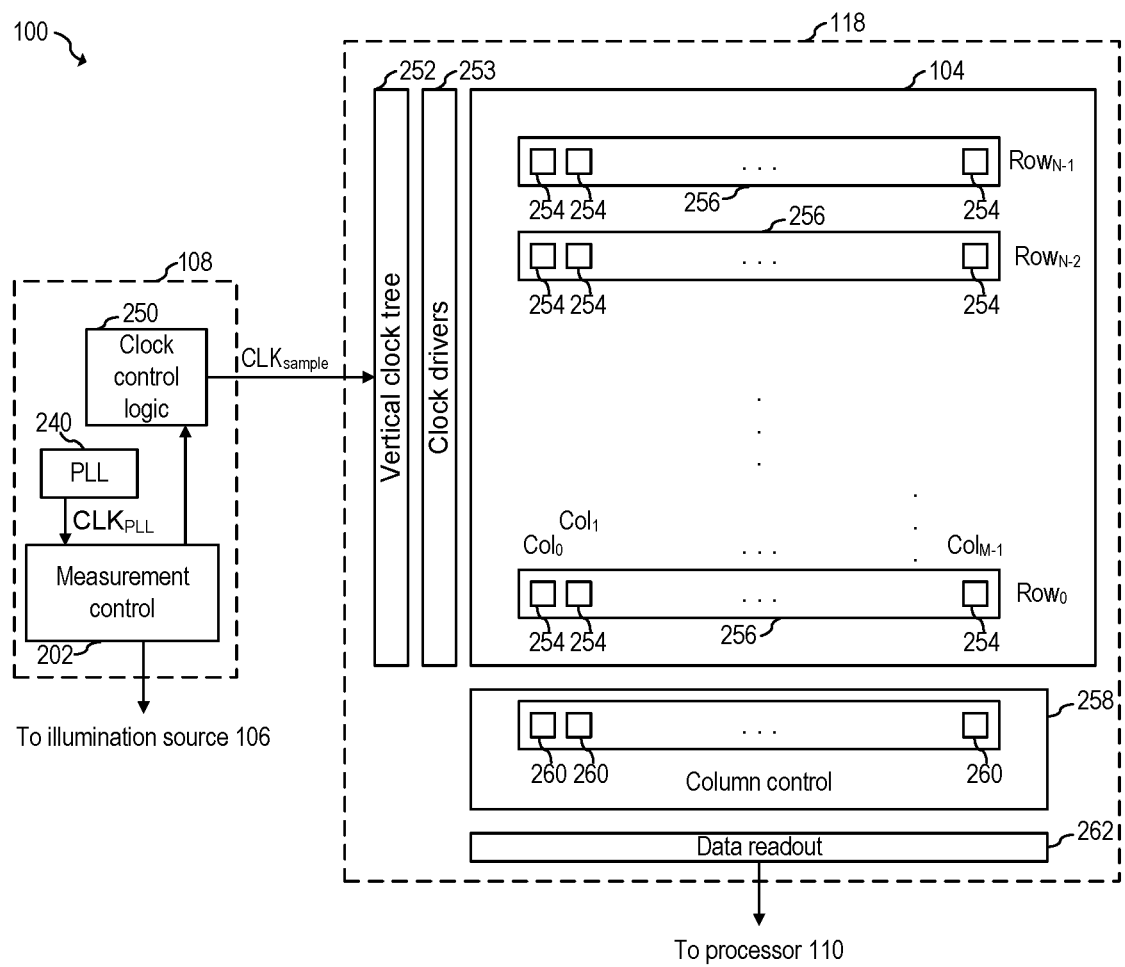
FIGS. 2A-2C show diagrams illustrating top views of layouts of portions of possible implementations of the ToF imaging system of FIG. 1, according to embodiments of the present invention.
Figure 2B:
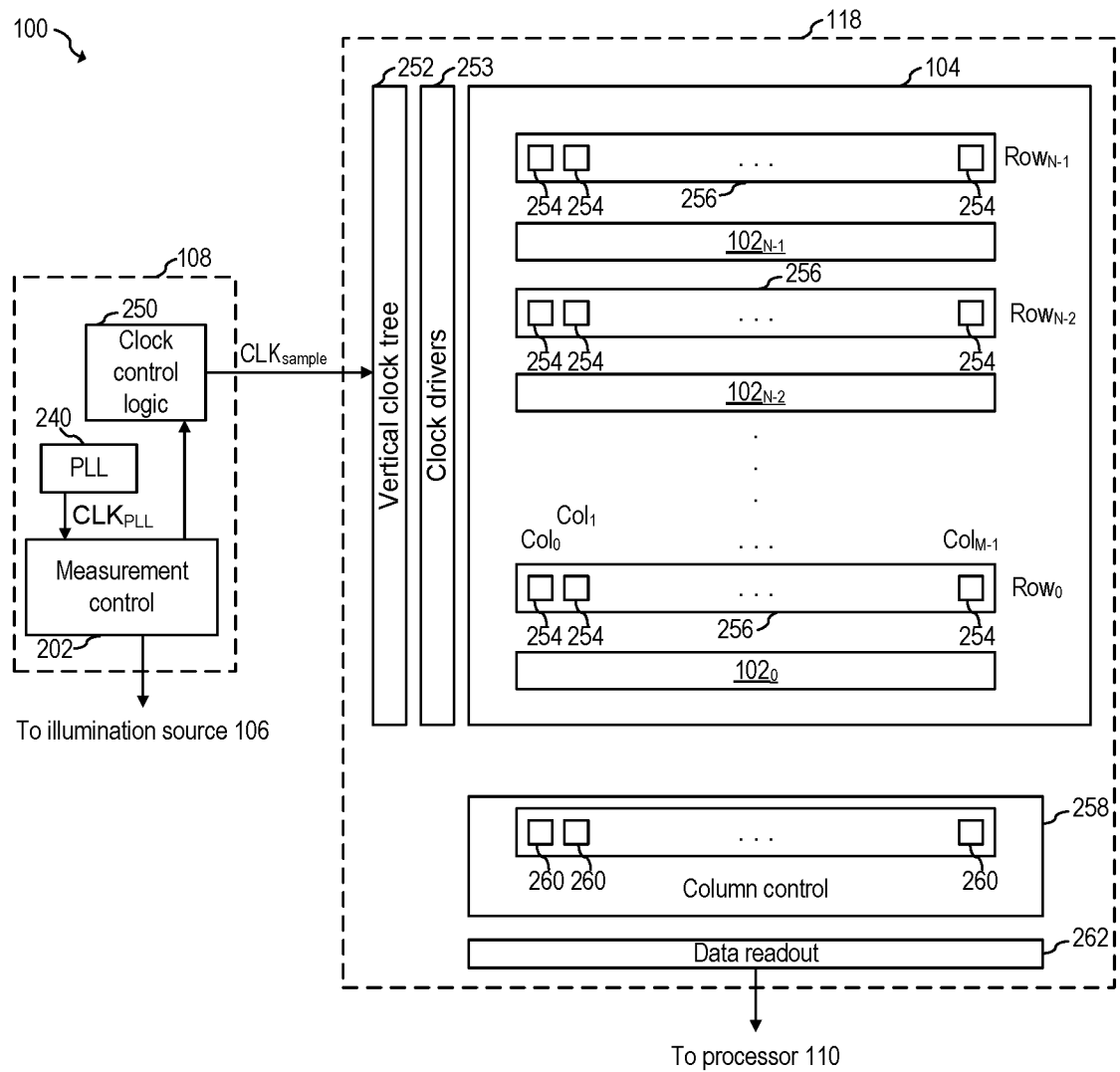
Figure 2C:
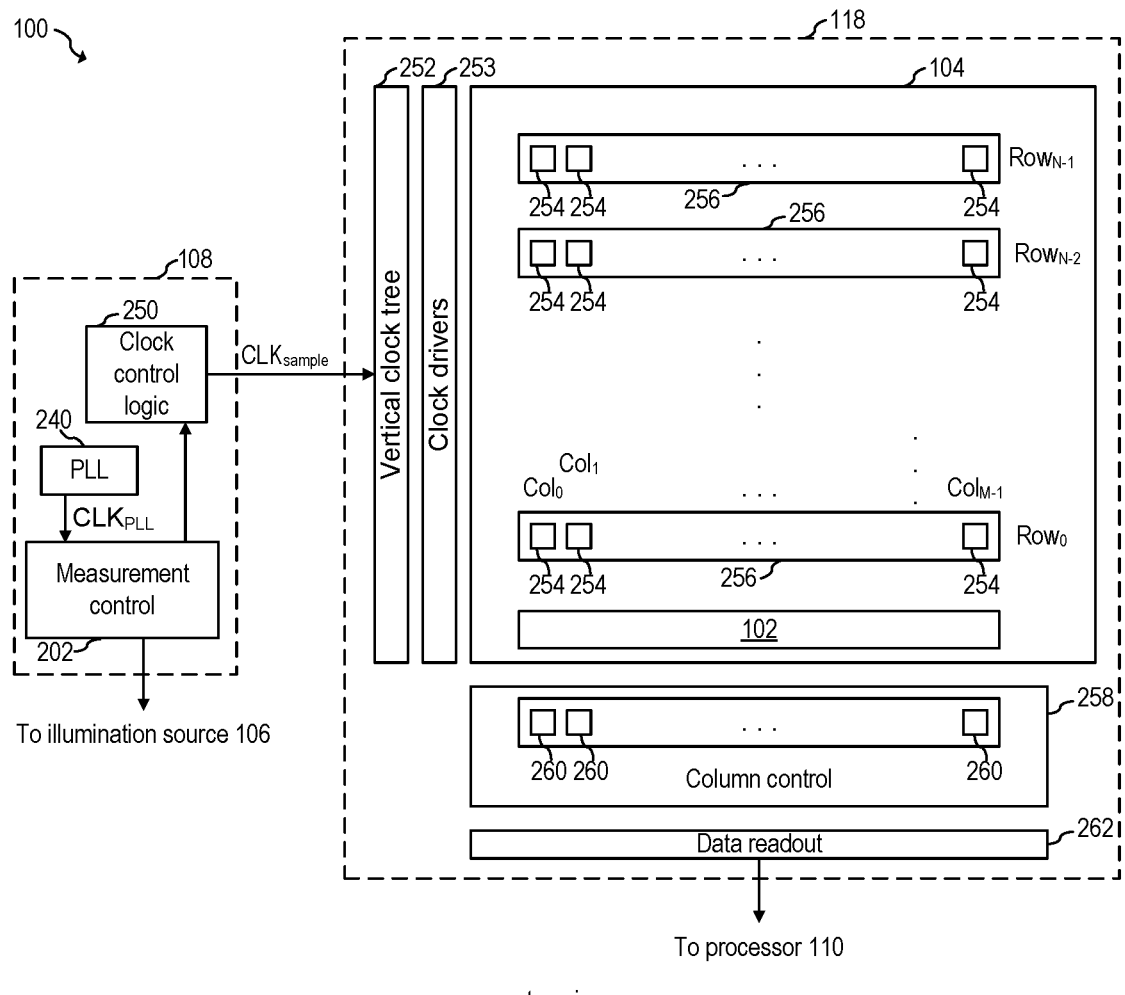

ToF image sensor 118 is configured to generate one or more histograms with data corresponding to the times between emitted and received radiation pulses. ToF image sensor 118 includes SPAD array 104 and TDC and histogram circuit 102. For example, FIGS. 2A-2C show diagrams illustrating top views of layouts of possible implementations of a portion of ToF imaging system 100 (not to scale), according to embodiments of the present invention. The description that follows focuses on the implementation shown in FIG. 2A but applies in a similar manner to the implementations of FIGS. 2B and 2C.

As shown in FIG. 2A, timing generation circuit 108 includes PLL 240, clock control logic circuit 250, and measurement control circuit 202. ToF image sensor 118 includes vertical clock tree 252, clock drivers 253, column control 258, data readout circuit 262, and SPAD array 104. SPAD array 104 includes N rows 256, where N is a positive integer greater than 1 such as 8, 11, 16, 32, etc. Each row 256 has M pixels 254, where M is a positive integer greater than 1 such as 8, 13, 16, 32, etc. Each pixel 254 includes one or more SPADs, where each SPAD or group of SPADs is associated with a respective TDC. Column control 258 includes M control circuits 260 (one per column of SPAD array 104). In some embodiments, each pixel 254 includes a respective TDC physically located inside the pixel (e.g., beneath the SPAD or group of SPADs). In some embodiments, the TDC(s) are embedded in SPAD array 104 (e.g., vertically spread under a column of pixels, such as shown, e.g., in FIG. 2B). In some embodiments, the TDC(s) (and histogram generation circuits) are located in the edge of SPAD array 104 (such as shown, e.g., in FIG. 2C).

During normal operation, PLL 240 generates clock $CLK_{PLL}$ and provides it to measurement control circuit 202. Measurement control circuit 202 generates system clock $CLK_{SYS}$ (not shown) based on clock $CLK_{PLL}$ for use in ToF imaging system loft Measurement control circuit 202 also transmits a clock signal that is synchronized with the generation of radiation pulses 112 to clock control logic circuit 250. Clock control logic circuit 250 generates clock $CLK_{sample}$, which is synchronized with the generation of radiation pulses 112, based on the clock received from measurement control circuit 202 and provides clock $CLK_{sample}$ to SPAD array 104 using clock trees and clock drivers to balance clock timing.

As will be explained in more detail later, each TDC associated with SPAD array 104 generates, in cooperation with its respective control circuit 260, a zoomed histogram based on radiation pulses received by the SPAD(s) associated with the respective TDC. The zoomed histogram is generated using an n-step successive approximation approach, where n is a positive integer greater than 1, such as 2, 3, 4, 5, 6, etc. Data readout circuit 262 is used as an interface so that processor no can read the zoomed histograms from ToF image sensor 118.

In some embodiments, the zoomed histograms are transferred in parallel by the control circuits 260 to the readout circuit 262 using, e.g., a parallel bus. The zoomed histograms are read from readout circuit 260 by processor no using, e.g., a serial bus, such as serial peripheral bus interface (SPI) or serial high-speed interfaces such as MIPI D-PHY, M-PHY or C-PHY. Other implementations are also possible. In some embodiments, the zoomed histograms are read directly by data readout circuit 262 from each of pixels 254 and forwarded to processor no, e.g., using a serial communication interface. In some embodiments, data readout circuit 262 optionally includes temporary storage to store one or more of the zoomed histograms.

Column control 258 includes M control circuits 260 (one for each column). In some embodiments, each of the control circuits 260 may be shared among the TDCs of SPAD array 104 in a different manner. For example, in some embodiments, column control 258 includes M/2 control circuits 260, where each control circuit 260 is shared by two columns. Other implementations are also possible.

Each pixel 254 includes a SPAD coupled to a TDC. For example, in some embodiments, such as shown in FIG. 2A, the SPAD is disposed on a top layer of an IC (such as IC 120), while the corresponding TDC is disposed below the corresponding SPAD in a layer between the substrate and the SPAD. Other implementations are possible. For example, in some embodiments, more than one SPAD (e.g., in the top layer) share a TDC (e.g., disposed below the corresponding group of SPADs), e.g., via an OR tree or other combinatorial logic, such as a digital adder, for example. Some embodiments, such as shown in FIG. 2B, each pixel 254 includes one or more SPADs and the corresponding TDCs and histogram generation circuits are vertically spread under a column of pixels. Some embodiments, such as shown in FIG. 2C, each pixel 254 includes one or more SPADs and the corresponding TDCs and histogram generation circuits are located in the edge of the pixel array.

SPAD array 104 may occupy an area as small as 1 mm by 1 mm (1 $mm^2$) or smaller, or as big as 6 mm by 6 mm (36 $mm^2$) or bigger. The area occupied by SPAD array 104 does not have to be square (e.g., 2 mm by 3 mm). Other dimensions for SPAD array 104 are also possible.

Portions of ToF imaging system 100, such as SPAD array 104, column control circuit 258, PLL 240, clock control logic circuit 250, vertical clock tree 252, clock drivers 253, data readout circuit 262, and measurement control circuit 202 may be implemented in an IC (such as IC 120) having a monolithic semiconductor substrate. The specific layout locations of particular blocks shown in FIG. 2A are show as an example only. Other arrangements are also possible.

In some embodiments, ToF imaging system 100 may be implemented in a multi-chip package having more than one semiconductor substrate. Other embodiments may implement one or more portions of ToF imaging system wo with discrete components.

PLL 240 may be implemented in any way known in the alt. PLL may generate the reference clock at frequencies such as 1 GHz, 2 GHz, 4 GHz or higher. Lower frequencies, such as 500 MHz or lower may also be used. In some embodiments, PLL 240 may be a fractional PLL configured to generate a clock with a frequency between 2 GHz and 4 GHz. Other frequencies may also be used.

In an embodiment of the present invention, a histogram with a small number of bins (e.g., 16 bins) is generated locally (e.g., physically located in pixel 254). A control circuit (e.g., control circuit 260) performs a successive approximation method to incrementally zoom into a region of interest (depth of interest) by reading the local histogram and configuring the TDC and/or histogram generation circuit to focus on the region of interest.

Figure 3A:
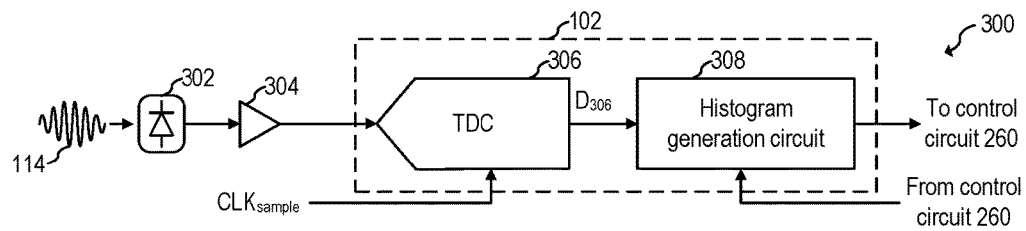
FIGS. 3A and 3B show schematic diagrams of possible implementations of any of the pixels of FIGS. 2A-2C and associated circuits, according to embodiments of the present invention.

FIG. 3A shows a schematic diagram of pixel 300, according to embodiments of the present invention. In some embodiments, pixel 254 may be implemented, e.g., as pixel 300. As shown in FIG. 3, pixel 300 includes TDC and histogram circuit 102, SPAD 302, and buffer 304. TDC and histogram circuit 102 includes TDC 306, and histogram generation circuit 308. TDC and histogram circuit 102 may also be referred to as zoom TDC. In some embodiments, pixel 300 includes SPAD 302, but does not include TDC 306 or histogram generation circuit 308 (such as shown, e.g., in FIGS. 2B and 2C). However, the explanation that follows applies in a similar manner to pixels that include SPAD 302 but do not include TDC 306 and/or histogram generation circuit 308 (such as shown, e.g., in FIGS. 2B and 2C).

During normal operation, reflected radiation pulse 113 stimulates SPAD 302. Each time SPAD 302 is stimulated, a signal is propagated through buffer 304 (e.g., buffer 304 pulses). TDC 306 receives the pulses from buffer 304 and determines ToF based on clock $CLK_{sample}$ (which is synchronized with the emission of radiation pulses 112.

Histogram generation circuit 308 initially generates a coarse histogram of coarse bins (e.g., 16 bins) based on the output of TDC 306. Control circuit 260 receives from histogram generation circuit 308 the coarse histogram and determines (e.g., based on a peak search), the bin(s) in which the target is located. Control circuit 260 then configures histogram generation circuit 308 to zoom into the bins of interest (e.g., around the peak found using, e.g., a peak search algorithm), thereby generating a fine (zoom) histogram with fine bins (e.g., 16 bins) around the peak found based on new outputs from TDC 306.

In some embodiments, histogram generation circuit 308 comprises memory, such as an SRAM memory located inside each pixel 254, configured to store the count of bins of the coarse and fine histograms. In some embodiments, the memory may be located outside pixels 254, such as in an area adjacent to SPAD array 104 (e.g., inside column control 258). In some embodiments, the same memory cells may be used first to store the coarse histogram, and subsequently to store the fine histogram (thereby erasing some or all data associated with the coarse histogram).

TDC 306 is configured to output a timestamp (a digital code $D_{306}$ indicative of time) and may be implemented in any way known in the art. For example, in some embodiments, an address indicative of time is propagated through SPAD array 104, and each TDC 306 latches the address at the instant that the corresponding SPAD(s) are asserted, and subsequently outputs such address. In some embodiments, TDC 306 may be implemented as a gray-code latch with low-voltage differential signaling (LVDS) clocks. Other implementations are also possible.

Figure 3B:
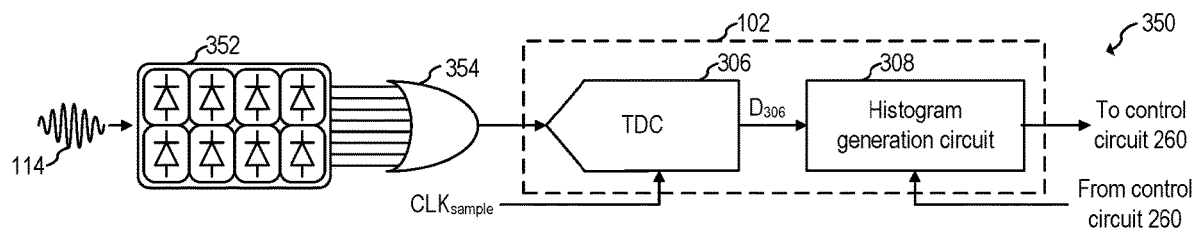

FIG. 3B shows a schematic diagram of pixel 350, according to embodiments of the present invention. In some embodiments, pixel 254 may be implemented, e.g., as pixel 350. Pixel 350 operates in a similar manner as pixel 300. Pixel 350, however, includes SPAD cluster 352 instead of a single SPAD 302, and includes (and/or is associated with) OR tree 354 coupled to TDC 306 instead of buffer 304. Even though SPAD cluster 352 is shown to include 8 SPADs, a different number of SPADs, such as 2, 6, 9, or more may also be used.

Figure 4:
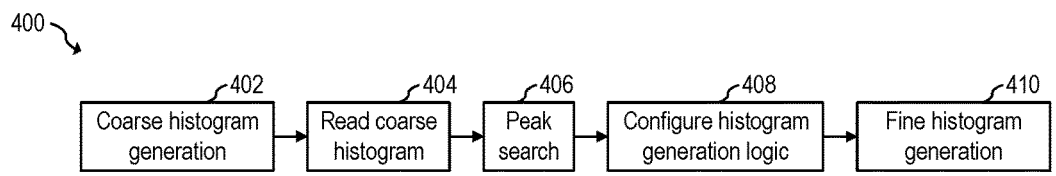
FIG. 4 shows a flow chart of an embodiment method for generating a fine, zoom, histogram, according to an embodiment of the present invention.
Figure 5:
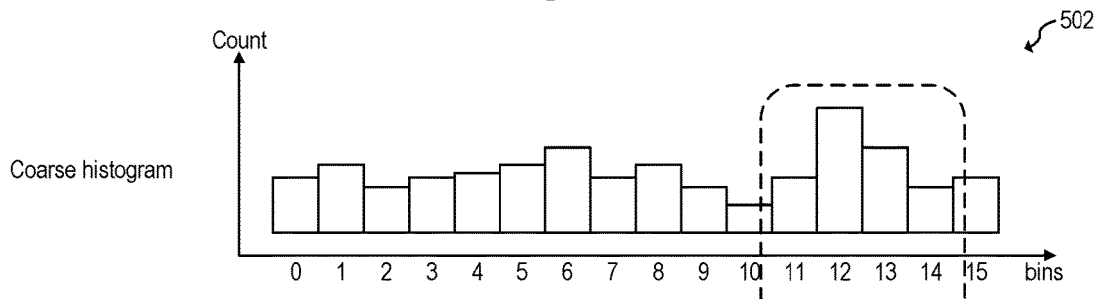
FIG. 5 shows coarse and fine histograms, according to an embodiment of the present invention.
Figure 5:

FIG. 4 shows a flow chart of embodiment method 400 for generating a fine, zoom, histogram, according to an embodiment of the present invention. FIG. 5 shows coarse histogram 502 and fine histogram 504, according to an embodiment of the present invention. FIG. 4 may be understood in view of FIGS. 3 and 5.

During step 402, histogram generation circuit 308 generates a coarse histogram, such as coarse histogram 502, based on the output of TDC 306. In this example, coarse histogram 502 has 16 coarse bins. Some embodiments may generate histograms with a different number of bins, such as 20 bins, 32 bins, 64, bins, or higher, or 10 bins, 8 bins, or lower.

Each coarse bin has a coarse time window. For example, in some embodiments, each coarse bin has a time window of 5 ns. Other embodiments may use a different time window for each coarse bin, such as 2.5 ns.

During step 404, the control circuit 260 associated with histogram generation circuit 308 receives (e.g., reads) from histogram generation circuit 308 the coarse histogram. In some embodiments, control circuit 260 reads from histogram generation circuit 308 the coarse histogram using a parallel interface.

During step 406, control circuit 260 performs a peak search to determine the highest peak of the histogram. Control circuit 260 may use any suitable peak search algorithm, such as a linear search, for example. In the example shown in FIG. 5, the peak is located in coarse bin 12.

During step 408, control circuit 260 configures histogram generation circuit 308 so that it zooms into bins at or near the detected peak. In the example shown in FIG. 5, histogram generation circuit 308 is configured to zoom into bins 11, 12, 13, and 14.

During step 410, histogram generation circuit 308 generates a fine histogram, such as fine histogram 504, based on the output of TDC 306. In this example, fine histogram 504 has 16 fine bins, 4 fine bins per coarse bin. Some embodiments may generate fine histograms with a different number of bins per coarse bin, such as 2, 8, 9, 10, 16, etc., for example.

Each fine bin has a fine time window when compared to the coarse bin. For example, for coarse bins having a time window of 5 ns, each fine bin may have a corresponding time window of 1.25 ns.

In some embodiments, the number of coarse bins and the number of fine bins is the same, thereby advantageously allowing for a full reuse of the underlying memory. In some embodiments, the effective resolution of the coarse bins may be doubled by using time-offset techniques, such as explained below with respect to FIG. 6.

As shown, some embodiments ignore outputs of TDC 308 that are outside the zoomed histogram time window (in the example of FIG. 5, between the time windows associated with bins 11-14). Some embodiments may advantageously achieve higher precision (e.g., the precision of a histogram having 64 bins) using only a fraction of the bins (e.g., 16 bins).

As shown, histogram generation is performed locally in ToF image sensor 118 (e.g., between pixel 254 and control circuit 260) instead of in processor no. By reducing the number of bins in the histogram, some embodiments advantageously achieve lower area consumption of ToF image sensor 118 since less memory is devoted for histogram generation and storage.

As another example, an embodiment that generates a 32 coarse bin histogram and a 16 fine bin zoom histogram may achieve the depth precision of a histogram having 128 bins while only transmitting to data readout circuit 262 16 bins of the histogram.

In some embodiments, SPAD 302 is disposed in a top layer of an IC (such as IC 120) while buffer 304, TDC 306, and histogram generation circuit 308 are disposed in layers between a substrate of the IC and SPAD 302. In some embodiments, circuits 304, 306, and 308 are fully underneath SPAD 302. In other words, in some embodiments, SPAD 302 is fully on top of circuits 304, 306, and 308. In other embodiments, circuits 304, 306, and 308 are only partially underneath SPAD 302. In yet other embodiments, circuits 304, 306, and 308 are not underneath SPAD 302. For example, in some embodiments, TDC 306 and histogram generation circuit 308 may be located in an area outside SPAD array 104.

Figure 6:
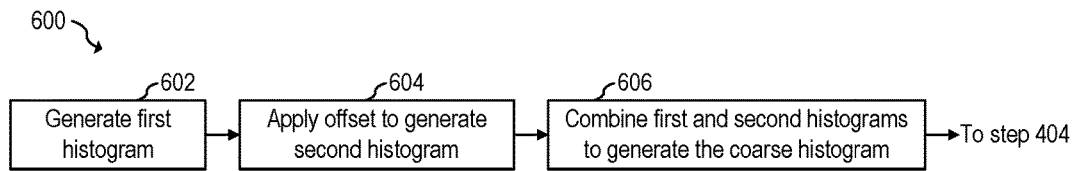
FIG. 6 shows a flow chart of an embodiment method for generating a coarse histogram, according to an embodiment of the present invention.
Figure 7:
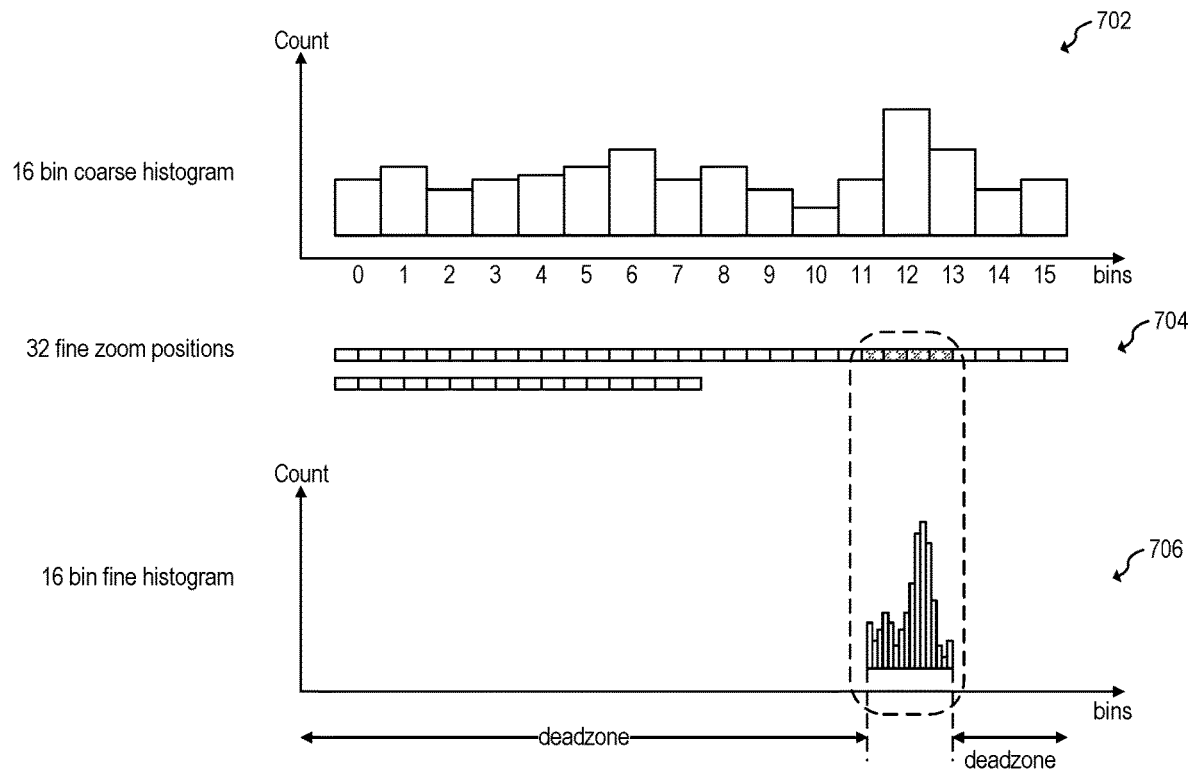
FIG. 7 shows coarse and fine histograms, according to an embodiment of the present invention.

FIG. 6 shows a flow chart of embodiment method 600 for generating a coarse histogram, according to an embodiment of the present invention. Step 402 may be implemented by method 600. FIG. 7 shows coarse histogram 702 and fine histogram 704, according to an embodiment of the present invention. FIG. 6 may be understood in view of FIGS. 3, 4, and 7.

During step 602, a first histogram 702 is generated, e.g., in a similar manner as in step 402. In this example, histogram 702 has 16 coarse bins.

During step 604, a second histogram is generated by applying an offset of half a cycle (half of the coarse step) to, e.g., $CLK_{sample}$. Other than the clock offset, the second histogram is generated in a similar manner as the first histogram. The second histogram is not shown in FIG. 7.

During step 606, the first and second histograms (each having 16 bins) are combined into a 32 bin coarse histogram. In some embodiments, the offset technique (which may also be referred to as a dither) advantageously spreads the energy to better resolve the target energy and to overcome, at least partially, the quantization effect that may be exhibited in the coarse bins. FIG. 7 shows in 704 the 32 bins of the combined coarse histogram (without showing the counts).

As shown in FIG. 6, the combined histogram is read during step 404, and step 406, 408, and 410 are performed, e.g., as described with respect to FIG. 4. Fine histogram 706 shows a histogram that may result from performing the steps 602, 604, 606, 404, 406, 408, and 410.

Figure 8:
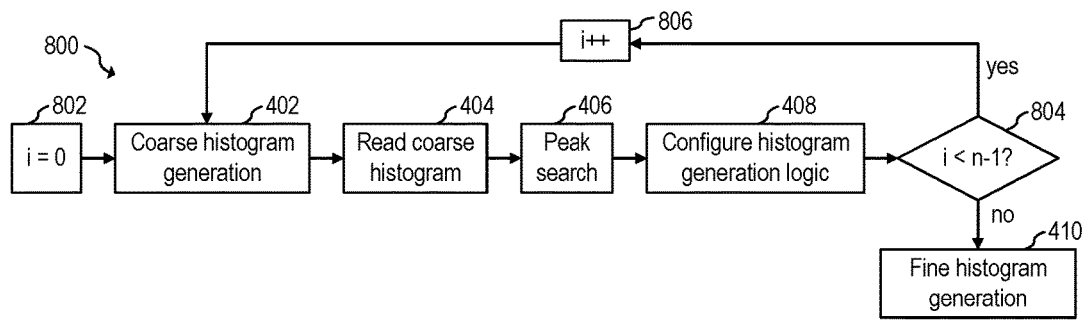
FIG. 8 shows a flow chart of an embodiment method for generating a fine, zoom, histogram using an n-step SAR, according to an embodiment of the present invention.

FIGS. 4 and 6 describe a 2-step successive approximation register (SAR) zoom histogram generation. Some embodiments may perform more than 2 steps for SAR zoom histogram generation. For example, in some embodiments, steps may be performed in the following sequence: 602, 604, 606, 404, 406, 408, 602, 604, 606, 404, 406, 408, 410. For example, FIG. 8 shows a flow chart of embodiment method 800 for generating a fine, zoom, histogram using an n-step SAR, according to an embodiment of the present invention. Method 800 is similar to method 400. Method 800, however, includes a loop using a counter (i) that is used in steps 802, 804, and 806.

As shown, when n is equal to 2, method 800 is similar to method 400 (2-step SAR zoom histogram generation). However, method 800 also illustrates performing a 3-step SAR zoom histogram generation (when n is equal to 3) or higher.

Figure 9:
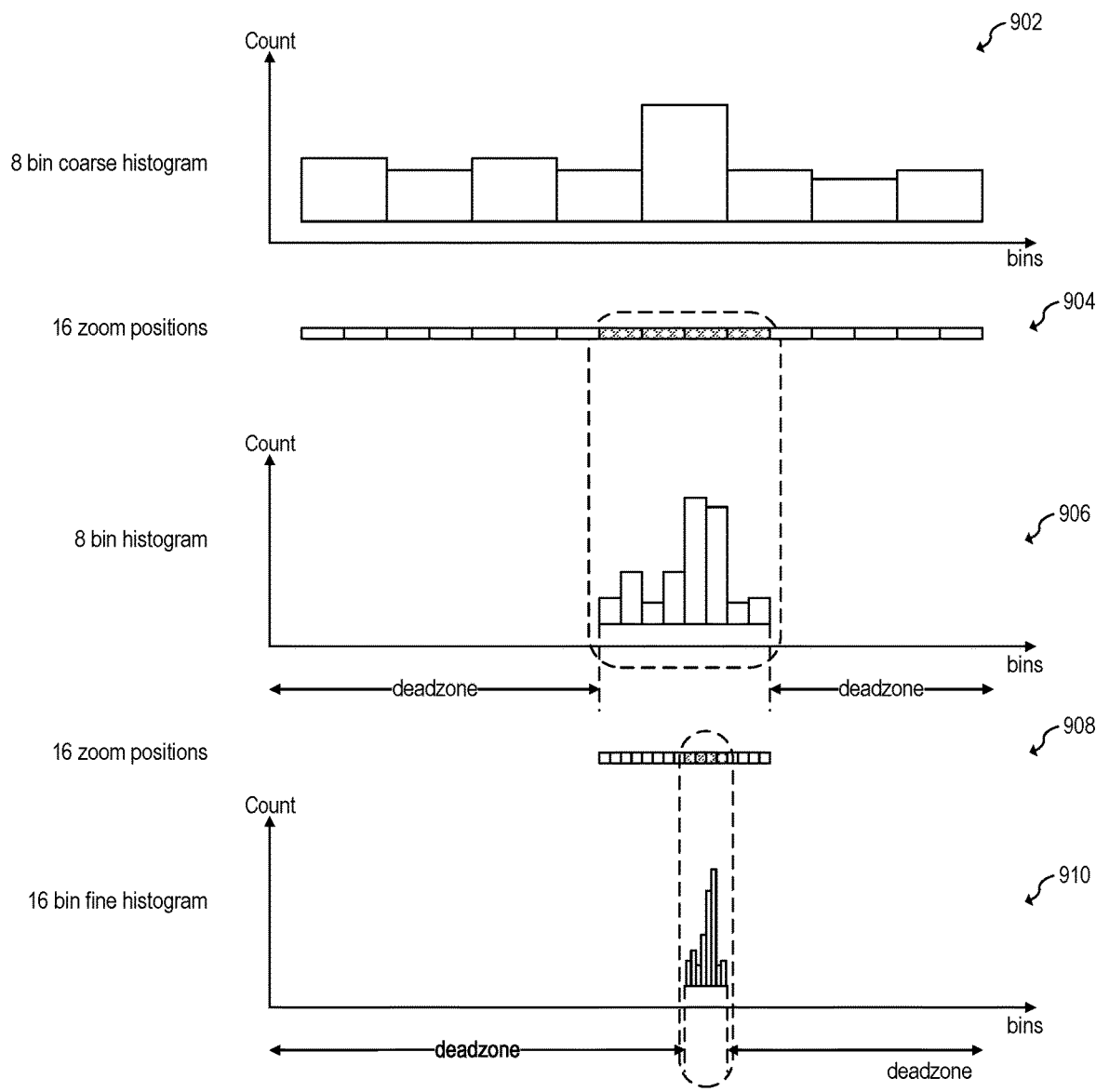
FIG. 9 shows histograms generated while performing a 3-step SAR using the method of FIG. 8, according to an embodiment of the present invention.

FIG. 9 shows histograms 902, 906, and 910 generated while performing a 3-step SAR using method 800, according to an embodiment of the present invention. In the example of FIG. 9, each bin of histogram 902 has a time window of 10 ns per bin. Histogram 902 covers a depth of 12 m. Each bin of histogram 906 has a time window of 2.5 ns per bin. Histogram 906 covers a depth of 3 m. Each bin of histogram 910 has a time window of 625 ps per bin. Histogram 910 covers a depth of 0.75 m.

Figure 10:
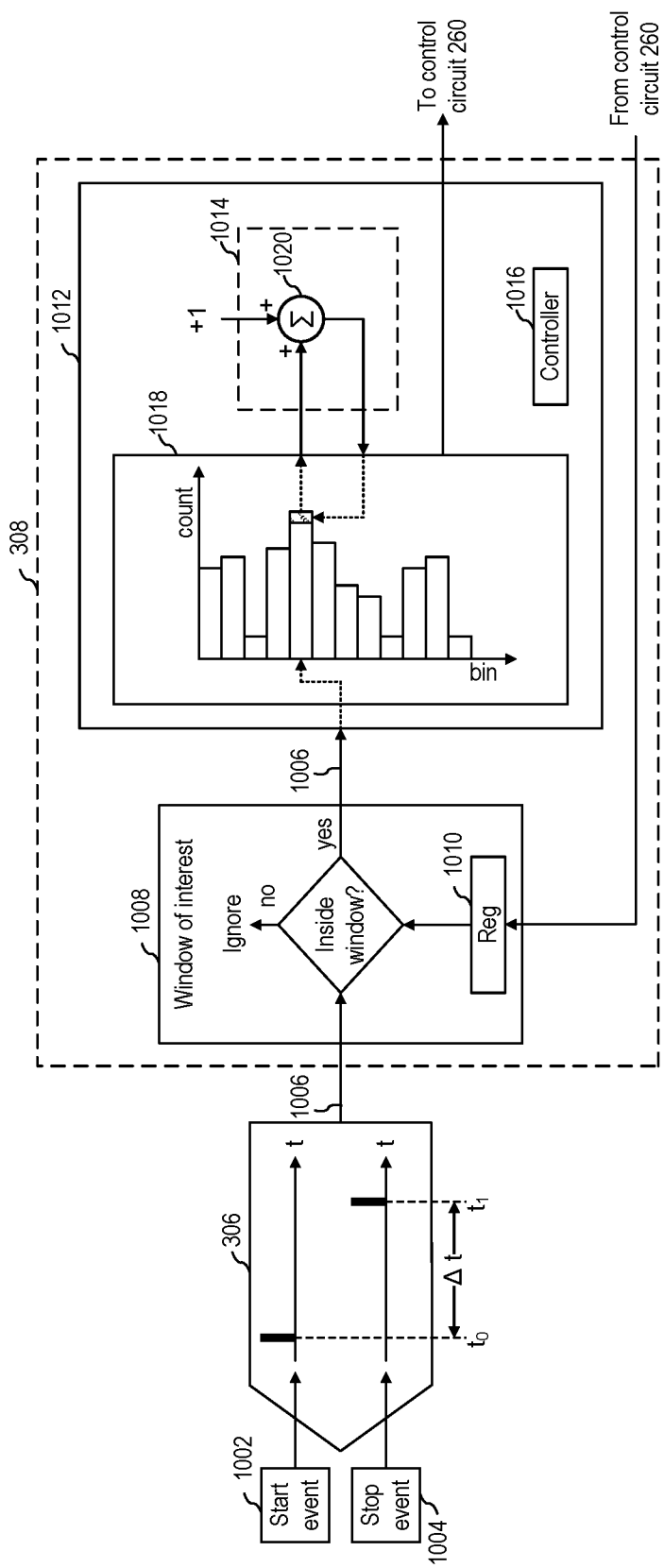
FIG. 10 shows a possible implementation of a portion of a pixel of FIG. 3A or 3B and/or associated circuits, according to an embodiment of the present invention.

FIG. 10 shows a possible implementation of a portion of pixel 300, according to an embodiment of the present invention. As shown, histogram generation circuit 308 includes window of interest circuit 1008, and histogram circuit 1012. Histogram circuit 1012 includes histogram storage 1018, accumulator circuit 1014, and controller 1016.

During normal operation, TDC 306 receives start event 1002 (e.g., based on clock $CLK_{sample}$) each time a radiation pulse 112 is emitted. TDC 306 also receives stop event 1004 from SPAD 302 each time SPAD 302 receives reflected radiation pulse 114. TDC 306 generates digital code 1006 based on the time Δt between $t_o$ (the time of start event 1002) and $t_1$ (the time of stop event 1004).

Window of interest circuit 1008 receives digital code 1006 and determines whether digital code 1006 is within the window of interest. If digital code 1006 is outside the window of interest, digital code 1006 is ignored. If digital code 1006 is inside the window of interest, then digital code 1006 is used to update histogram storage 1018, e.g., by controller 1016 performing a read, update, write-back operation. For example, in some embodiments, histogram storage 1018 stores each bin in a register. Controller 1016 reads the bin of histogram storage 1018 that corresponds to digital code 1006, increments the content read by 1 using adder 1020 of accumulator circuit 1014, and writes back the accumulated data into the bin of histogram storage 1018 that corresponds to digital code 1006.

In some embodiments, the window of interest is determined based on the content of register 1010. For example, in some embodiments, the register 1010 points to the start bin of the window of interest and the window of interest has a fixed duration (e.g., 16 bins) starting at the location indicated by register 1010. In other embodiments, the duration of the window of interest may also be modified (e.g., by using another register not shown). Other implementations are also possible.

In some embodiments, histogram generation circuit 308 operates in a coarse mode (when processing the coarse histogram) and in a fine mode (when processing the fine histogram). In the coarse mode, histogram generation circuit 308 uses only the MSBs of code 1006 to generate the coarse histogram (and ignores the LSBs). In the fine mode, histogram generation circuit uses only the LSBs of code 1006 to generate the fine histogram (and ignores the MSBs).

In some embodiments, clock $CLK_{sample}$ is a single clock signal. In some embodiments, clock $CLK_{sample}$ includes a plurality of clock signals in a multi-phase manner or with a multi-bit code. TDC 306 uses the plurality of clock signals to determine code 1006.

Controller 1016 may be implemented, e.g., as an asynchronous state machine. In some embodiments, controller 1016 may also perform one or more operations of window of interest circuit 1008. In some embodiments, controller 1016 may be implemented as a controller or processor that includes, for example, combinatorial circuits coupled to a memory. Other implementations are also possible.

Histogram storage 1018 may be implemented with, e.g., volatile or non-volatile memory. For example, histogram storage 1018 may be implemented with registers implemented with, e.g., D-flip-flops, static random-access memory (SRAM), latch-based memory (latch cells), and/or ripple counters (e.g., made with D-flip-flops). Other implementations are also possible.

Figure 11:
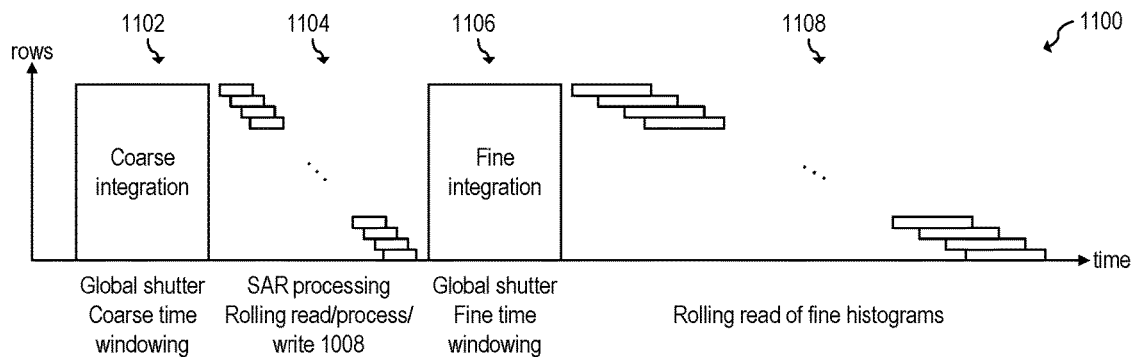
FIGS. 11-13 show timing diagrams of integration and readout times, according to embodiments of the present invention.

FIG. 11 shows timing diagram 1100 of integration and readout times, according to an embodiment of the present invention.

As shown in FIG. 11, during the coarse integration step 1102, coarse operations, which include step 402, are performed in parallel for each row. During the SAR processing step 1104, which includes the readout of histogram storage 1018 by control circuit 260, peak search step 406 and the configuration of register 1010 during step 408 are performed sequentially or partially sequentially (e.g., since control circuit 260 is shared, e.g., by a column of pixels 254). During the fine integration step 1106, fine operations, which includes step 410, are performed in parallel for each row. During the readout of fine histogram step 1108, processor no sequentially reads each fine histogram for each pixel 254 (e.g., by sequentially reading each fine histogram of a row, and then sequentially reading each fine histogram of the next row, etc.).

Some embodiments may perform portions of steps 1102, 1104, 1106, and 1108, in parallel. For example, in a column having N pixels 300, a first subset of pixels subset$_1$ may include, e.g., N/2 pixels in the column and a second subset of pixels subset$_2$ may include the other N/2 of pixels in the column. Each subset subset$_1$ and subset$_2$ may perform operations in parallel. In some embodiments, there may be more than two subsets. In some embodiments, the number of pixels in each subset may not be equal.

Figure 12:
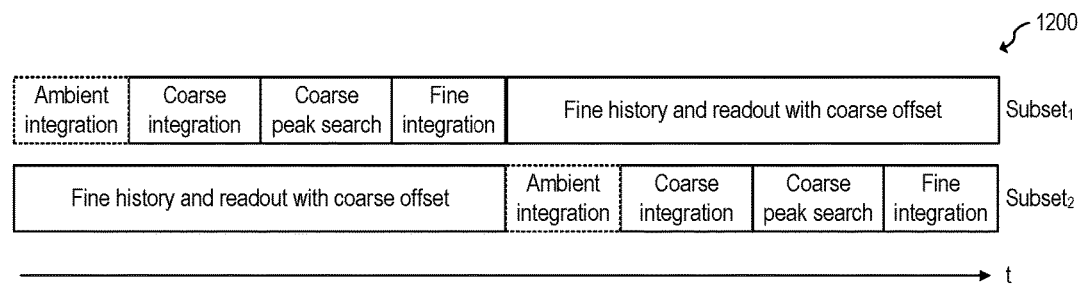

FIG. 12 shows timing diagram 1200 of integration and readout times of a first (subset$_1$) and second (subset$_2$) subset of pixels, according to an embodiment of the present invention. As shown, steps associated with subset$_1$ and subset$_2$ may be performed in parallel. When the subset$_1$ is performing the coarse integration (step 1102), coarse peak search (step 1104), and fine integration (step 1106), the subset 2 is performing the fine histogram readout (step 1108). Similarly, when the subset$_2$ is performing the coarse integration (step 1102), coarse peak search (step 1104), and fine integration (step 1106), the subset$_1$ is performing the fine histogram readout (step 1108).

Figure 13:
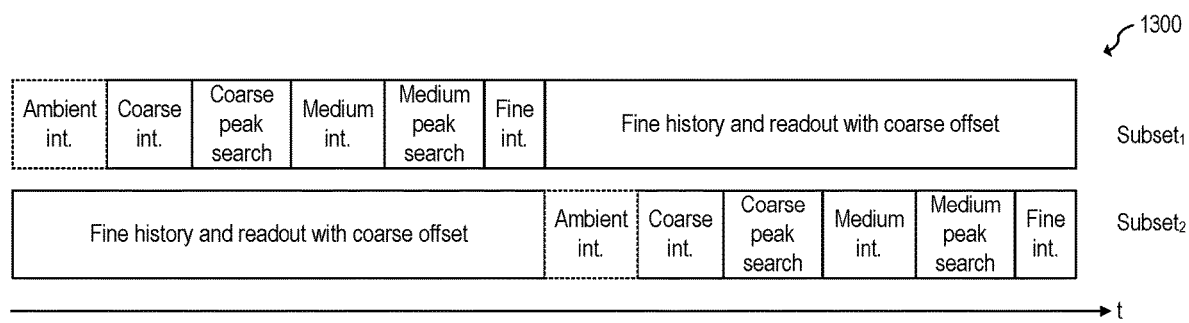

FIG. 13 shows timing diagram 1300 of integration and readout times of a first and second subset of pixels for a 3-step SAR zoom histogram generation, according to an embodiment of the present invention.

Figure 14:
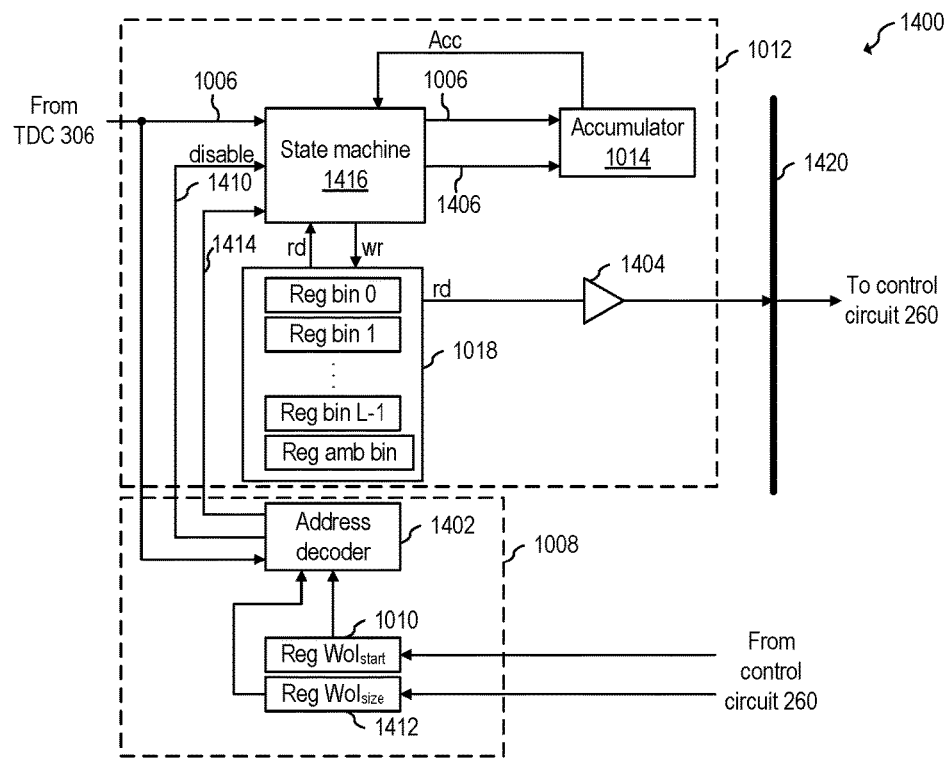
FIG. 14 shows a schematic diagram of a possible implementation of the histogram generation circuit of FIG. 10, according to an embodiment of the present invention.

FIG. 14 shows a schematic diagram of histogram generation circuit 1400, according to an embodiment of the present invention. Histogram generation circuit 308 may be implemented as histogram generation circuit 1400. Histogram generation circuit 1400 includes asynchronous state machine 1416, accumulator 1014, histogram storage 1018, address decoder 1402, register low, and buffer 1404. Histogram storage 1018 includes a plurality of registers for storing bins of the histogram.

During normal operation, address decoder 1402 receives digital code 1006 from TDC 306. Address decoder 1402 checks whether digital code 1006 is within the window of interest based on the content of register low. If digital code 1006 is outside the window of interest, address decoder 1402 disables state machine 1416 (e.g., by asserting disable signal 1410) until the next digital code 1006 is received. The next digital code 1006 received may be processed without delay and may not be ignored.

If digital code 1006 is inside the window of interest, address decoder 1402 does not disable state machine 1416 (e.g., by deasserting disable signal 1410 or ensuring that disable signal 1410 is deasserted). State machine 1416 receives digital code 1006 from TDC 306 and also receives from address decoder 1402 digital code 1414 associated to the address of the register bin of histogram storage 1018 that corresponds to digital code 1006.

State machine 1416 performs a read/accumulate/write operation by reading the register bin of histogram storage 1018 that corresponds to digital code 1006 from histogram storage 1018, providing the read value 1406 and digital code 1006 to accumulator 1014, receiving the accumulated value (e.g., read value+1.) from accumulator 1014, and writing back to the register bin of histogram storage 1018 that corresponds to digital code 1006 the accumulated value.

During the time in which state machine 1416 is performing the read/accumulate/write operation, any new digital code 1006 received may be ignored. For example, if performing the read/accumulate/write operation takes 15 ns, then during the 15 ns after receiving a digital code 1006, any other digital code 1006 received is ignored. When asynchronous state machine 1416 is not performing the read/accumulate/write operation, asynchronous state machine, upon receipt of a new code 1006, performs a read/accumulate/write operation unless asynchronous state machine 1416 is disabled by address decoder 1402.

In some embodiment, if the pulse repetition rate (PRT) of the emitted radiation pulses 112 is short (e.g., shorter than twice the read/accumulate/write operation time), then a single reflected radiation pulse 114 is processed per emitted radiation pulse 112. If the PRT is long (e.g., longer than twice the read/accumulate/write operation time), then multiple reflected radiation pulses 114 may be received and processed per emitted radiation pulse 112.

In some embodiments, the PRT is selected such that it includes a blanking time (e.g., after the deadzone) to account for radiation pulses that are reflected from far objects.

State machine 1416 may be implemented as a synchronous state machine or as an asynchronous state machine. State machine 1416 may be implemented, e.g., using combinatorial logic, e.g., coupled to a memory.

Control circuit 260 is configured to read the content of the registers of histogram storage 1018, e.g., sequentially (e.g., during step 1104), via buffer 1404. In some embodiments, control circuit 260 reads the data from histogram storage 1028 using bus 1420 that is also connected to other pixels 254 in the column.

Control circuit 260 is also configured to write register 1010, e.g., based on the processing of the read registers (e.g., based on the result of a peak search of the read registers).

Control circuit 260 may be implemented with combinatorial logic physically located in column control 258 and may be shared by, e.g., N pixels (where N is the number of rows in SPAD array 104). In some embodiments, control circuit 260 may be implemented inside each pixel 254, and each control circuit 260 may be dedicated to each pixel 254. Other implementations are also possible. For example, in some embodiments, each pair of pixels may share a control circuit 260.

In some embodiments, register 1010 points to the first register bin in which the window of interest begins. For example, during coarse integration step 1102, register 1010 may point to the first register bin 0. During step 1106 (after SAR processing step 1104), control circuit 260 writes to register 1010 a value so that register 1010 points to the first register of the window of interest. For example, in the example shown in FIG. 7, control circuit 260 writes register low so that it points to register bin 23.

In some embodiments, register 1412 determines the number of bins included in the window of interest. In such embodiments, the content of register 1412 may also be used to determine whether code 1006 is inside the window of interest. For example, during coarse integration step 1102, the content of register 1412 is such that the window of interest covers all the coarse bins. During step 1106, the content of register 1412 is indicative of the number of bins for the fine integration (e.g., covering 4 coarse bins instead of all coarse bins). The same process can be extended for n-step SAR histogram generations, where n is higher than 2.

Figure 15:
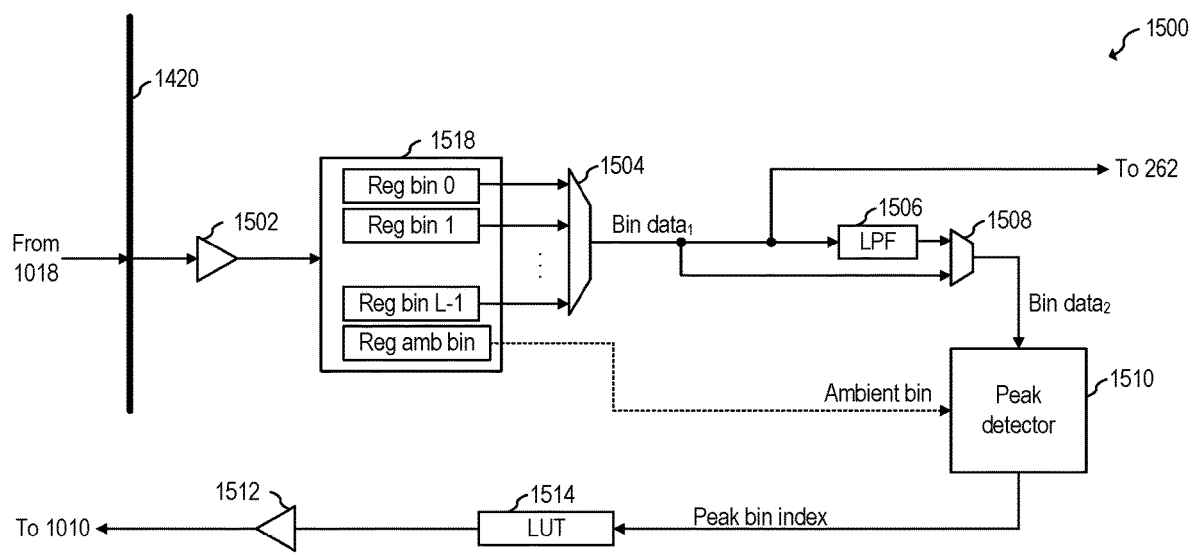
FIG. 15 shows a schematic diagram of a possible implementation of the histogram generation circuit of any of FIGS. 2A-2C, according to an embodiment of the present invention.

FIG. 15 shows a schematic diagram of control circuit 1500, according to an embodiment of the present invention. Control circuit 260 may be implemented as control circuit 1500. Control circuit 1500 includes histogram storage 1518, selection circuits 1504 and 1508, filter 1506, peak detector 1510, look-up-table (LUT) 1514, and buffers 1502 and 1512. Control circuit 260 has a coarse mode of operation and a fine mode of operation. Control circuit may operate in the coarse mode of operation during step 1104. Control circuit 1500 may operate in the fine mode of operation during step 1108. For embodiments having more than 2-step SAR histogram generation, control circuit 1500 may operate in the coarse mode except for the last step after the fine integration step (step 1108), in which control circuit 1500 operates in the fine mode of operation.

During the coarse mode of operation, control circuit 1500 receives histogram data, e.g., sequentially, from, e.g., each pixel 254 in a column of pixels via bus 1420. For each pixel 254, control circuit 1500 receives, e.g., sequentially, data from each register bin of histogram storage 1018 and stores it in histogram storage 1518. In some embodiments, storing the histogram data into histogram storage 1518 may be skipped and the subsequent steps may be performed directly upon receipt of the histogram data from histogram storage 1018. Such embodiments may be implemented, e.g., without histogram storage 1518.

Selection circuit 1504 (e.g., a multiplexer) provides, e.g., sequentially, each received bin data to peak detector 1510 (e.g., via one or more circuits or directly).

In some embodiments, a low pass filter (LPF) 1506 to filter the bin data before performing a peak search by peak detector 1510. For example, in some embodiments, a 3-tap FIR filter is used to smooth the histogram. Other implementations are also possible. For example, some embodiments may be implemented without filter 1506, or with a filter of a different type.

In some embodiments, selection circuit 1508 (e.g., a multiplexer) is used to select between a filtered version of the bin data (e.g., bin data$_2$ is a filtered version of bin data$_1$) or a non-filtered version of the bin data (e.g., bin data$_2$ is equal to bin data$_1$) to be used by peak detector 1510 to perform the peak search. Some embodiments may be implemented without selection circuit 1508, such as by having LPF 1506 directly connected to peak detector 1510 or by having the output of selection circuit 1504 directly connected to peak detector 1510.

Peak detector 1510 performs a peak search of the received bin data to identify the index of the bin that has the highest accumulated value. For example, in some embodiments, a linear search is performed for the L bins, and the highest accumulated value is provided to LUT 1514. In other embodiments, a peak is only detected if the highest value is higher than a predetermined threshold. If the bin with the highest value is smaller than the predetermined threshold, then no peak is detected (e.g., no target is detected) and step 1102 is repeated after step 1104 (instead of step 1106).

If a peak is detected by peak detector 1510, LUT 1514 receives the bin index for the peak bin (for the bin with the highest count). LUT then generates and writes a value into register 1010 (e.g., via buffer 1512) so that register 1010 points to the beginning of a desired window of interest based on the index of the peak bin. For example, in the example of FIG. 5, the peak bin is bin 12, and the register 1010 is written such that register low points to bin 11 as the beginning of the window of interest.

During the fine mode of operation, control circuit 1500 receives histogram data, e.g., sequentially, from, e.g., each pixel 254 in a column of pixels via bus 1420. For each pixel 254, control circuit 1500 receives, e.g., sequentially, data from each register bin of histogram storage 1018 and forwards it to readout circuit 262 (e.g., sequentially) via, e.g., circuits 1518, and 1504 during step 1108.

Figure 16:
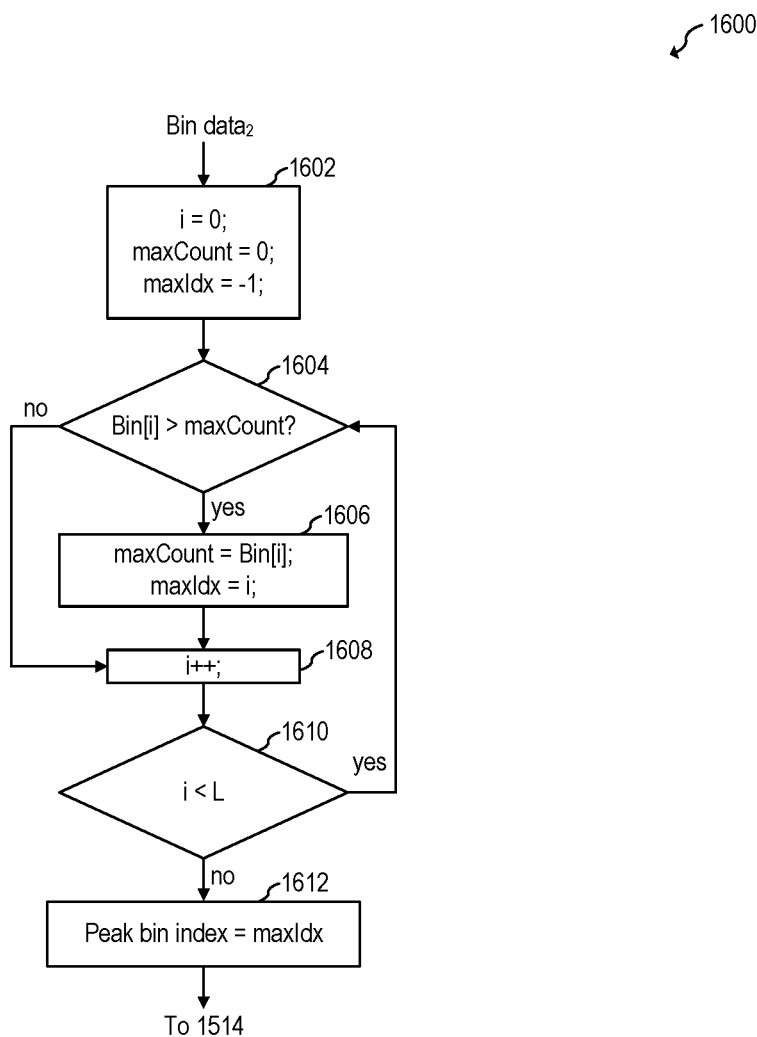
FIGS. 16-18 show flow charts of embodiment methods for generating the peak bin index by the peak detector of FIG. 15, according to embodiments of the present invention.

FIG. 16 shows a flow chart of embodiment method 1600 for generating the peak bin index by peak detector 1510, according to an embodiment of the present invention.

During step 1602, peak detector 1510 receives bin data2, and variables i, maxCount, and maxIdx are initialized. Variable i is used to iterate through each count of each bin of bin data$_2$. Variable maxCount is used to store the maximum count (the count of the peak). The variable maxIdx is used to store the index of the bin having the maximum count.

During step 1602, variable is initialized to 0 (e.g., to point to the first bin in bin data$_2$), variable maxCount is initialized to 0 (e.g., to indicate that the no bin has exhibited a peak), and variable maxIdx is initialized to −1 (e.g., to indicate that the no bin has exhibited a peak). In some embodiments, different values may be used to initialized variables i, maxCount, and maxIdx.

During step 1604, the count of the bin located in position i (Bin[i]) is compared with the count stored in maxCount. If the Bin[i] is higher than maxCount, then maxCount is updated to be equal to Bin[i] and maxIdx is updated to be equal to i (during step 1606). If not, variables maxCount and maxIdx are not updated.

During step 1606, variable i is incremented to iterate through the next bin in bin data$_2$. During step 1610, if all bins of bin data$_2$ have been iterated through (if i is not less than total number of histogram bins L), then the peak index is set to maxIdx during step 1612. If there are still bins to be iterated through in bin data2 (if i is less than total number of histogram bins L), then step 1604 is performed.

Figure 17:
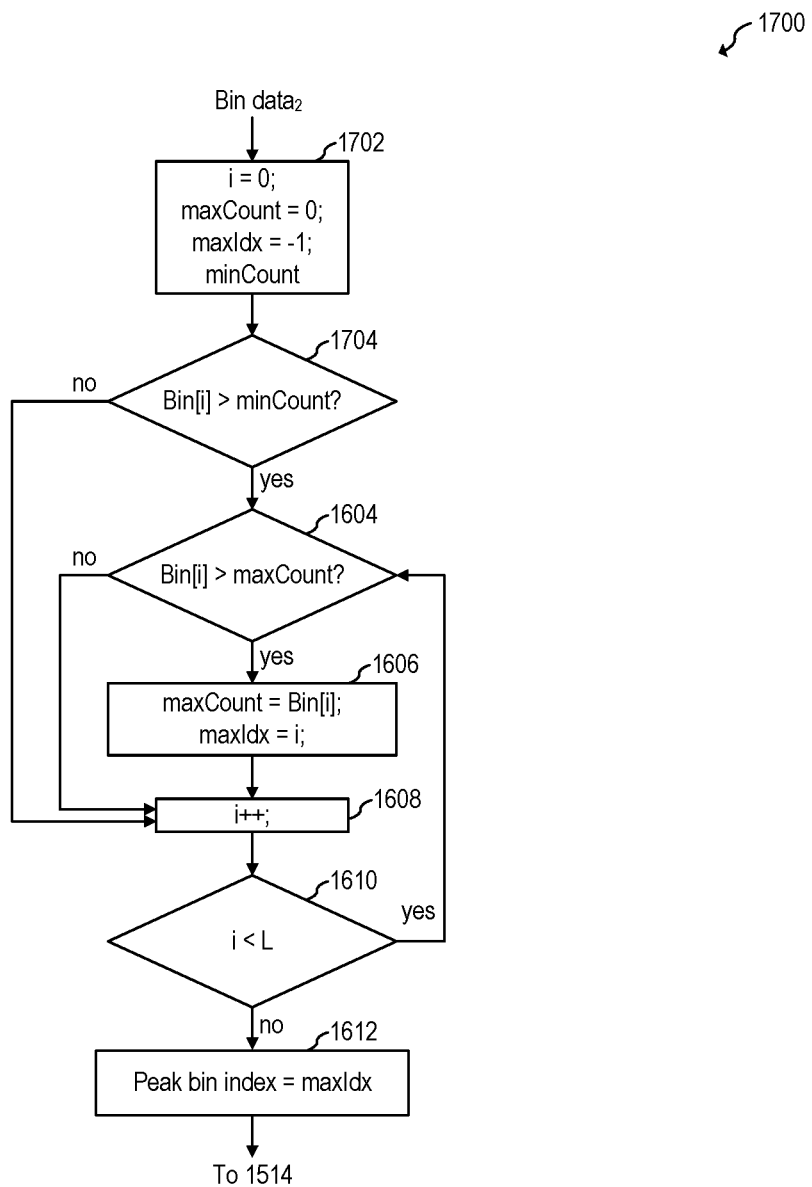

FIG. 17 shows a flow chart of embodiment method 1700 for generating the peak bin index by peak detector 1510, according to an embodiment of the present invention. Method 1700 is similar to method 1600. Method 1700, however, only considers counts of a bin if the count is above a predetermined threshold (represented by variable minCount).

In some embodiments, the predetermined threshold minCount may be fixed. In other embodiments, threshold minCount may be based on, e.g., the ambient noise of the histogram, shot noise of the histogram, or other parameter (and may, thus, be dynamically changed). For example, FIG. 18 shows a flow chart of embodiment method 1800 for generating the peak bin index by peak detector 1510 based on ambient noise, according to an embodiment of the present invention.

Figure 18:
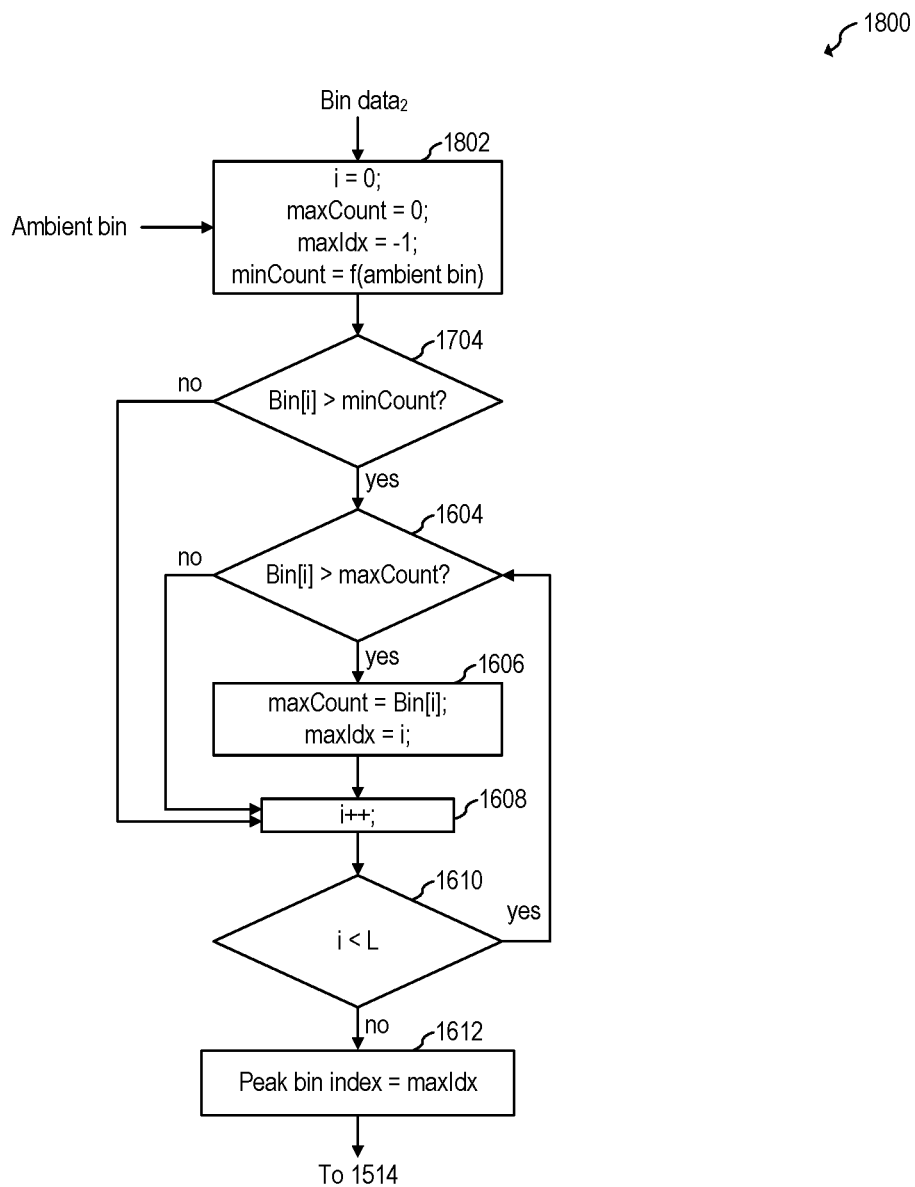

As shown in FIG. 18, minCount is a function of ambient bin (or ambient counter). The ambient bin may have, for example, a count equal to the average ambient noise associated with bin data$_2$.

In some embodiments, the ambient bin is populated at a time in which no reflected light pulses are expected (such as before emitting light pulses, e.g., before coarse integration, as shown by optional ambient integration block in FIGS. 12 and 13). Thus, the ambient count (of the ambient bin) may be used as an estimate for the number of SPAD activations associated with ambient light, as opposed to reflected light pulses. Such ambient count, therefore, may be used during the peak search.

In some embodiments, minCount is equal to the count of ambient bin (ambientBin). In other embodiments, minCount may be based on shot noise. For example, in some embodiments, minCount may be given by: minCount=ambientBin+$\sqrt{ambientBin}$. Other implementations are also possible.

Advantages of some embodiments include that a ToF image sensor having integrated TDCs and histogram generation capabilities can locally generate, e.g., at the pixel level, high resolution depth detection with a small number of bins. Some embodiments, therefore, may advantageously have low or reduced area consumption for a particular depth resolution, e.g., when compared to generating the full histogram with all fine bins for each coarse bins. In some embodiments, a lower power consumption is achieved as off-chip data transmission may be decreased (e.g., since only the window of interest of the generated histograms is transmitted off-chip).

Example embodiments of the present invention are summarized here. Other embodiments can also be understood from the entirety of the specification and the claims filed herein.

Example 1. A method including: receiving a first plurality of digital codes from a time-to-digital converter (TDC); generating a coarse histogram from the first plurality of digital codes, the coarse histogram including a plurality of coarse bins that collectively correspond to a coarse histogram depth range from a lower coarse histogram depth to a higher coarse histogram depth; detecting a peak coarse bin from the plurality of coarse bins, where the peak coarse bin corresponds to a peak coarse bin depth range from a lower coarse peak depth to a higher coarse peak depth; after receiving the first plurality of digital codes, receiving a second plurality of digital codes from the TDC; and generating a fine histogram from the second plurality of digital codes based on the detected peak coarse bin, the fine histogram including a plurality of fine bins that collectively correspond to a fine histogram depth range from a lower fine histogram depth to a higher fine histogram depth, where the fine histogram depth range is narrower than the coarse histogram depth range, where the lower fine histogram depth is lower or equal to the lower coarse peak depth, and where the higher fine histogram depth is higher or equal to the higher coarse peak depth.

Example 2. The method of example 1, where detecting the peak coarse bin includes detecting a peak bin that has a count above a predetermined threshold.

Example 3. The method of one of examples 1 or 2, further including determining the predetermined threshold based on an ambient bin of the coarse histogram.

Example 4. The method of one of examples 1 to 3, where determining the predetermined threshold includes determining the predetermined threshold by, where minCount corresponds to the predetermined threshold, and ambientBin corresponds to a count of the ambient bin.

Example 5. The method of one of examples 1 to 4, where each coarse bin of the plurality of coarse bins has a first depth granularity, and where each fine bin of the plurality of fine bins has a second depth granularity that is higher than the first depth granularity.

Example 6. The method of one of examples 1 to 5, further including: receiving a further plurality of digital codes from TDC before receiving the first plurality of digital codes; generating a further coarse histogram from the further plurality of digital codes, the further coarse histogram including a further plurality of coarse bins that collectively correspond to a further coarse histogram depth range from a further lower coarse histogram depth to a further higher coarse histogram depth; and detecting a further peak coarse bin from the further plurality of coarse bins, where the further peak coarse bin corresponds to a further peak coarse bin depth range from a further lower coarse peak depth to a further higher coarse peak depth, where the coarse histogram depth range is narrower than the fine histogram depth range, where the lower coarse histogram depth is lower or equal to the further lower coarse peak depth, and where the higher coarse histogram depth is higher or equal to the further higher coarse peak depth.

Example 7. The method of one of examples 1 to 6, where generating the coarse histogram includes: generating a first coarse histogram from a first portion of the first plurality of digital codes based on a first clock; generating a second coarse histogram from a second portion of the first plurality of digital codes based on an offset first clock; and combining the first and second coarse histograms to generate the coarse histogram.

Example 8. The method of one of examples 1 to 7, where generating the fine histogram includes: determining whether a first digital code of the second plurality of digital codes is within the fine histogram depth range based on a content of a first register; when the first digital code corresponds to a depth that is within the fine histogram depth range, incrementing a corresponding fine bin of the plurality of fine bins; and when the first digital code corresponds to a depth that is not within the fine histogram depth range, avoid updating the fine histogram based on the first digital code.

Example 9. The method of one of examples 1 to 8, further including updating the content of the first register based on the detected peak coarse bin.

Example 10. The method of one of examples 1 to 9, where the TDC has an input coupled to a first single photon avalanche diode (SPAD).

Example 11. The method of one of examples 1 to 10, where the input of the TDC is coupled to the first SPAD via a logic circuit.

Example 12. The method of one of examples 1 to 11, where the logic circuit includes an OR tree having a plurality of inputs respectively coupled to a plurality of SPADs, where the plurality of SPADs includes the first SPAD.

Example 13. A circuit including: a time-to-digital converter (TDC); a histogram generation circuit; and a control circuit, where the histogram generation circuit is configured to cooperate with the control circuit to: receive a first plurality of digital codes from the TDC, generate a coarse histogram from the first plurality of digital codes, the coarse histogram including a plurality of coarse bins that collectively correspond to a coarse histogram depth range from a lower coarse histogram depth to a higher coarse histogram depth, detect a peak coarse bin from the plurality of coarse bins, where the peak coarse bin corresponds to a peak coarse bin depth range from a lower coarse peak depth to a higher coarse peak depth, after receiving the first plurality of digital codes, receive a second plurality of digital codes from the TDC, and generate a fine histogram from the second plurality of digital codes based on the detected peak coarse bin, the fine histogram including a plurality of fine bins that collectively correspond to a fine histogram depth range from a lower fine histogram depth to a higher fine histogram depth, where the fine histogram depth range is narrower than the coarse histogram depth range, where the lower fine histogram depth is lower or equal to the lower coarse peak depth, and where the higher fine histogram depth is higher or equal to the higher coarse peak depth.

Example 14. The circuit of example 13, where the histogram generation circuit includes a first register, where the control circuit is configured to update a content of the first register based on the detected peak coarse bin.

Example 15. The circuit of one of examples 13 or 14, where the histogram generation circuit is configured to: whether a first digital code of the second plurality of digital codes is within the fine histogram depth range based on the content of the first register; when the first digital code corresponds to a depth that is within the fine histogram depth range, increment a corresponding fine bin of the plurality of fine bins; and when the first digital code corresponds to a depth that is not within the fine histogram depth range, avoid updating the fine histogram based on the first digital code.

Example 16. The circuit of one of examples 13 to 15, further including a single photon avalanche diode (SPAD) coupled to an input of the TDC via a logic circuit.

Example 17. A system including: a pixel array arranged in N rows and M columns, where N is a positive integer greater than 1, and where M is a positive integer greater than 1, and where each pixel includes a single photon avalanche diode (SPAD); a plurality of time-to-digital converters (TDCs), where each of the plurality of TDCs is associated with a respective pixel of the pixel array; a plurality of histogram g2Ceneration circuits, where each of the plurality of histogram generation circuits is associated with a respective TDC of the plurality of TDCs and with a respective pixel of the pixel array; and a column control circuit including M control circuits, each of the M control circuits configured to cooperate with histogram generation circuits associated with a corresponding column of pixels to: receive a first plurality of digital codes from the respective TDC, generate a coarse histogram from the first plurality of digital codes, the coarse histogram including a plurality of coarse bins that collectively correspond to a coarse histogram depth range from a lower coarse histogram depth to a higher coarse histogram depth, detect a peak coarse bin from the plurality of coarse bins, where the peak coarse bin corresponds to a peak coarse bin depth range from a lower coarse peak depth to a higher coarse peak depth, after receiving the first plurality of digital codes, receive a second plurality of digital codes from the respective TDC, and generate a fine histogram from the second plurality of digital codes based on the detected peak coarse bin, the fine histogram including a plurality of fine bins that collectively correspond to a fine histogram depth range from a lower fine histogram depth to a higher fine histogram depth, where the fine histogram depth range is narrower than the coarse histogram depth range, where the lower fine histogram depth is lower or equal to the lower coarse peak depth, and where the higher fine histogram depth is higher or equal to the higher coarse peak depth.

Example 18. The system of example 17, further including an illumination circuit configured to generate light pulses, where the pixel array is configured to receive reflected light pulses originating from the illumination circuit.

Example 19. The system of one of examples 17 or 18, where each pixel of the pixel array includes the respective TDC of the plurality of TDCs and the respective histogram generation circuit of the plurality of histogram generation circuits.

Example 20. The system of one of examples 17 to 19, where each pixel includes a plurality of SPADs coupled to the respective TDC via a respective OR tree.

Example 21. The system of one of examples 17 to 20, where the plurality of TDCs are vertically spread under a column of pixels.

Example 22. The system of one of examples 17 to 21, where the plurality of TDCs are disposed at an edge of the pixel array.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A method, comprising:
performing, using a time-to-digital converter (TDC) having an input coupled to a first single photon avalanche diode (SPAD) and to a second SPAD, time-to-digital conversions between emissions of radiation pulses and receptions of reflected radiation pulses by the first SPAD to provide a first plurality of digital codes, and by the second SPAD to provide a second plurality of digital codes;
generating a first coarse histogram corresponding to a first plurality of output values from the first plurality of digital codes;
determining a peak value of the first coarse histogram;
setting a window of interest based on the determined peak value for the first coarse histogram;
generating a first fine histogram corresponding to a second plurality of output values from the first plurality of digital codes, wherein the first fine histogram has a higher time resolution than the first coarse histogram;
during a first time period, reading out the first fine histogram, and, simultaneously with the reading out the first fine histogram associated with the first SPAD, performing the steps of:
generating a second coarse histogram corresponding to a first plurality of output values from the second plurality of digital codes,
determining a peak value of the second coarse histogram,
setting a window of interest based on the determined peak value for the second coarse histogram,
generating a second fine histogram corresponding to a second plurality of output values from the second plurality of digital codes; and
during a second time period different from the first time period, reading out the second fine histogram, and, simultaneously with the reading out the second fine histogram, performing the steps of generating the first coarse histogram, determining the peak value of the first coarse histogram, setting the window of interest based on the determined peak value for the first coarse histogram, and generating the first fine histogram.

2. The method of claim 1, wherein generating the first coarse histogram comprises:
determining whether an output value of the first plurality of output values is within the window of interest based on the determined park value for the first coarse histogram,
in response to a determination that the output value of the first plurality of output values is within the window of interest based on the determined peak value for the first coarse histogram, incrementing a count of a histogram bin associated with the output value.

3. The method of claim 1, further comprising, after setting the window of interest based on the determined peak value for the first coarse histogram and before generating the first fine histogram:
generating a medium resolution histogram from a third plurality of output values from the first plurality of digital codes;
determining a peak value of the medium resolution histogram; and
setting a window of interest based on the determined peak value for the medium resolution histogram, wherein the medium resolution histogram has a higher time resolution than the first coarse histogram and a lower resolution than the first fine histogram.

4. A circuit comprising:
a time-to-digital converter (TDC) configured to be coupled to a first group of photodetectors and to a second group of photodetectors different from the first group of photodetectors;
a histogram generation circuit; and
a control circuit, wherein the histogram generation circuit is configured to cooperate with the control circuit to:
generate a coarse histogram from a first plurality of output values from the TDC,
determine a peak value of the coarse histogram,
set a window of interest of the histogram generation circuit associated with the TDC based on the determined peak value for the coarse histogram,
generate a fine histogram from a second plurality of output values from the TDC within the window of interest of the determined peak value, wherein the fine histogram has a higher time resolution than the coarse histogram,
during a first time period, reading out the fine histogram associated with the first group of photodetectors, and, simultaneously with the reading out the fine histogram associated with the first group of photodetectors, performing the steps of generating the coarse histogram, determining the peak value of the coarse histogram, and generating the fine histogram associated with the second group of photodetectors different from the first group of photodetectors, and
during a second time period different from the first time period, reading out the fine histogram associated with the second group of photodetectors, and, simultaneously with the reading out the fine histogram associated with the second group of photodetectors, performing the steps of generating the coarse histogram, determining the peak value of the coarse histogram, and generating the fine histogram associated with the first group of photodetectors.

5. The circuit of claim 4, wherein the histogram generation circuit is configured to:
determine whether an output value of the TDC is within the window of interest; and
in response to a determination that the output value of the TDC is within the window of interest, increment a count of a histogram bin associated with the output value.

6. The circuit of claim 4, wherein the control circuit is further configured to cooperate with histogram generation circuit to, after setting the window of interest based on the determined peak value for the coarse histogram and before generating the fine histogram:
generate a medium resolution histogram from a third plurality of output values from the TDC;
determine a peak value of the medium resolution histogram; and
set a window of interest based on the determined peak value for the medium resolution histogram, wherein the medium resolution histogram has a higher time resolution than the coarse histogram and a lower resolution than the fine histogram.

7. The circuit of claim 6, wherein:
during the first time period, reading out the fine histogram associated with the first group of photodetectors is performed simultaneously with performing the steps of generating the coarse histogram, determining the peak value of the coarse histogram, generating the medium resolution histogram, determining the peak value of the medium resolution histogram, and generating the fine histogram associated with the second group of photodetectors different from the first group of photodetectors; and
during the second time period, reading out the fine histogram associated with the second group of photodetectors is performed simultaneously with the reading out the fine histogram associated with the second group of photodetectors, performing the steps of generating the coarse histogram, determining the peak value of the coarse histogram, generating the medium resolution histogram, determining the peak value of the medium resolution histogram, and generating the fine histogram associated with the first group of photodetectors.

8. The circuit of claim 4, further comprising a logic circuit coupled between an input of the TDC and outputs of the first group of photodetectors and the second group of photodetectors.

9. The circuit of claim 8, wherein the logic circuit comprises an OR tree having a plurality of inputs respectively coupled to the first group of photodetectors and the second group of photodetectors.

10. A system comprising:
a pixel array arranged in N rows and M columns, wherein N is a positive integer greater than 1, and wherein M is a positive integer greater than 1, and wherein each pixel comprises a single photon avalanche diode (SPAD);
a plurality of time-to-digital converters (TDCs), wherein each of the plurality of TDCs is associated with at least one respective pixel of the pixel array, wherein the at least one respective pixel is associated with a first group of pixels of the pixel array or a second group of pixels of the pixel array;
a plurality of histogram generation circuits, wherein each of the plurality of histogram generation circuits is associated with a respective TDC of the plurality of TDCs and its at least one respective pixel of the pixel array; and
a column control circuit comprising M control circuits, each of the M control circuits configured to cooperate with histogram generation circuits of the plurality of histogram generation circuits associated with a corresponding column of pixels to:
generate a coarse histogram from a first plurality of output values from the respective TDC,
determine a peak value of the coarse histogram,
set a window of interest of the histogram generation circuit associated with the respective TDC based on the determined peak value for the coarse histogram,
generate a fine histogram from a second plurality of output values from the respective TDC within the window of interest of the determined peak value, wherein the fine histogram has a higher time resolution than the coarse histogram, during a first time period, reading out the fine histogram associated with the first group of pixels of the pixel array, and, simultaneously with the reading out the fine histogram associated with the first group of pixels of the pixel array, performing the steps of generating the coarse histogram, determining the peak value of the coarse histogram, and generating the fine histogram associated with the second group of pixels of the pixel array different from the first group of pixels of the pixel array, and during a second time period different from the first time period, reading out the fine histogram associated with the second group of pixels of the pixel array, and, simultaneously with the reading out the fine histogram associated with the second group of pixels of the pixel array, performing the steps of generating the coarse histogram, determining the peak value of the coarse histogram, and generating the fine histogram associated with the first group of pixels of the pixel array.

11. The system of claim 10, wherein each histogram generation circuit of the plurality of histogram generation circuits is configured to:

determine whether an output value of the respective TDC is within the window of interest, in response to a determination that the output value of the respective TDC is within the window of interest, increment a count of a histogram bin associated with the output value.

12. The system of claim 10, wherein the column control circuit is further configured to cooperate with the histogram generation circuits to, after setting the window of interest based on the determined peak value for the coarse histogram and before generating the fine histogram:

generate a medium resolution histogram from a third plurality of output values from the respective TDC;

determine a peak value of the medium resolution histogram; and set a window of interest based on the determined peak value for the medium resolution histogram, wherein the medium resolution histogram has a higher time resolution than the coarse histogram and a lower resolution than the fine histogram.

13. The system of claim 12, wherein:

during the first time period, reading out the fine histogram associated with the first group of pixels of the pixel array is performed simultaneously with performing the steps of generating the coarse histogram, determining the peak value of the coarse histogram, generating the medium resolution histogram, determining the peak value of the medium resolution histogram, and generating the fine histogram associated with the second group of pixels of the pixel array different from the first group of pixels, and during the second time period, reading out the fine histogram associated with the second group of pixels of the pixel array is performed simultaneously with the reading out the fine histogram associated with the second group of pixels of the pixel array, performing the steps of generating the coarse histogram, determining the peak value of the coarse histogram, generating the medium resolution histogram, determining the peak value of the medium resolution histogram, and generating the fine histogram associated with the first group of pixels of the pixel array.

14. The system of claim 10, further comprising an illumination circuit configured to generate light pulses, wherein the pixel array is configured to receive reflected light pulses originating from the illumination circuit.

15. The system of claim 10, wherein each pixel of the pixel array comprises the respective TDC of the plurality of TDCs and the respective histogram generation circuit of the plurality of histogram generation circuits.

16. The system of claim 10, wherein each pixel comprises a plurality of SPADs coupled to the respective TDC via a respective OR tree.

17. The system of claim 10, wherein the plurality of TDCs are vertically spread under a column of pixels.

18. The system of claim 10, wherein the plurality of TDCs are disposed at an edge of the pixel array.

19. The system of claim 10, wherein the SPADs of the pixel array are located in a first layer, wherein the plurality of TDCs are located in a second layer located below the first layer, and wherein each TDC of the plurality of TDCs is located at least partially underneath the SPAD of the at least one respective pixel of the pixel array.

20. The system of claim 10, further comprising a clock generator coupled to the plurality of TDCs, the plurality of histogram generation circuits, and the column control circuit, the clock generator comprising a phase locked loop (PLL).

* * * * *

UNITED STATES PATENT AND TRADEMARK OFFICE
CERTIFICATE OF CORRECTION

PATENT NO. : 12,345,834 B2
APPLICATION NO. : 18/390534
DATED : July 1, 2025
INVENTOR(S) : Neale Dutton et al.

Page 1 of 1

It is certified that error appears in the above-identified patent and that said Letters Patent is hereby corrected as shown below:

In the Claims

In Column 18, Line 63, Claim 2:
Change "on the determined park value for the first coarse" to --on the determined peak value for the first coarse--

Signed and Sealed this
Twelfth Day of August, 2025

Coke Morgan Stewart
*Acting Director of the United States Patent and Trademark Office*